United States Patent
Zhang et al.

(10) Patent No.: US 11,914,110 B2
(45) Date of Patent: Feb. 27, 2024

(54) PHOTOGRAPHIC OPTICAL SYSTEM

(71) Applicant: ZHEJIANG SUNNY OPTICS CO., LTD., Zhejiang (CN)

(72) Inventors: Kaiyuan Zhang, Zhejiang (CN); Biao Xu, Zhejiang (CN); Lin Huang, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 420 days.

(21) Appl. No.: 17/257,027

(22) PCT Filed: Jul. 11, 2019

(86) PCT No.: PCT/CN2019/095616
§ 371 (c)(1),
(2) Date: Dec. 30, 2020

(87) PCT Pub. No.: WO2020/093725
PCT Pub. Date: May 14, 2020

(65) Prior Publication Data
US 2021/0255432 A1    Aug. 19, 2021

(30) Foreign Application Priority Data
Nov. 7, 2018    (CN) .......................... 201811318627.6

(51) Int. Cl.
*G02B 13/00*    (2006.01)
*G02B 9/62*     (2006.01)
*G02B 27/00*    (2006.01)

(52) U.S. Cl.
CPC ........... *G02B 13/0045* (2013.01); *G02B 9/62* (2013.01); *G02B 27/0025* (2013.01)

(58) Field of Classification Search
None
See application file for complete search history.

(56) References Cited

U.S. PATENT DOCUMENTS 9,995,913 B1 *   6/2018  Fang .................. G02B 13/0045
2006/0132929 A1  6/2006  Ito
(Continued)

FOREIGN PATENT DOCUMENTS

CN    102778745 A    11/2012
CN    105988187 A    10/2016
(Continued)

*Primary Examiner* — Robert E. Tallman
(74) *Attorney, Agent, or Firm* — Yu Gang

(57) ABSTRACT

The disclosure discloses a photographic optical system, sequentially includes from an object side to an image side along an optical axis: a first lens, a second lens, a third lens, a fourth lens, a fifth lens and a sixth lens. Wherein the first lens has a positive refractive power, an object-side surface thereof is a convex surface, an image-side surface is a concave surface. The second lens has a negative refractive power, an object-side surface thereof is a convex surface, an image-side surface is a concave surface. The sixth lens has a negative refractive power. TTL is a distance from the object-side surface of the first lens to an imaging surface of the photographic optical system on the optical axis and ImgH is a half the diagonal length of an effective pixel area on the imaging surface of the photographic optical system, and TTL and ImgH satisfy TTL/ImgH<1.5.

18 Claims, 20 Drawing Sheets

(56) References Cited

U.S. PATENT DOCUMENTS

| | | | | |
|---|---|---|---|---|
| 2014/0185150 A1* | 7/2014 | Shinohara | ............... | G02B 3/04 |
| | | | | 359/713 |
| 2014/0347745 A1* | 11/2014 | Shinohara | .......... | G02B 13/0045 |
| | | | | 359/713 |
| 2016/0259150 A1 | 9/2016 | Shin et al. | | |
| 2017/0097493 A1* | 4/2017 | Dai | ................... | G02B 13/0045 |
| 2018/0164550 A1 | 6/2018 | Wang | | |

FOREIGN PATENT DOCUMENTS

| | | |
|---|---|---|
| CN | 106483637 A | 3/2017 |
| CN | 106802469 A | 6/2017 |
| CN | 107015345 A | 8/2017 |
| CN | 107272161 A | 10/2017 |
| CN | 107688223 A | 2/2018 |
| CN | 107783261 A | 3/2018 |
| CN | 108152934 A | 6/2018 |
| CN | 109031629 A | 12/2018 |
| CN | 209044159 U | 6/2019 |
| IN | 105807409 A | 7/2016 |
| JP | 2009288300 A | 12/2009 |
| JP | 2015072405 A | 4/2015 |

* cited by examiner lateral color curve longitudinal aberration curve astigmatism curve longitudinal aberration curve astigmatism curve longitudinal aberration curve astigmatism curve longitudinal aberration curve astigmatism curve

PHOTOGRAPHIC OPTICAL SYSTEM

CROSS-REFERENCE TO RELATED APPLICATION(S)

The disclosure claims priority to and the benefit of Chinese Patent Application No. 201811318627.6, filed in the China National Intellectual Property Administration (CNIPA) on 7 Nov. 2018, which is incorporated herein by reference in its entirety.

TECHNICAL FIELD

The disclosure relates to a photographic optical system, and more particularly, the disclosure relates to a photographic optical system including six lenses.

BACKGROUND

Along with the progress of sciences and technologies, electronic products with photographic functions have been rapidly developed, and requirements of users on photographic optical systems applied to portable electronic products have gradually increased. In addition, along with the progress of technologies of Charge-Coupled Device (CCD) or Complementary Metal Oxide Semiconductor (CMOS) image sensors and the like, the number of image elements on a chip is increased, and meanwhile, the size of a single image element is reduced, so that it also puts forward higher and higher requirements for high imaging performance of a matched photographic optical system.

Therefore, there is a need for a photographic optical system with characteristics of large image surface, large aperture, ultra-small thickness and the like.

SUMMARY

The disclosure provides a photographic optical system applicable to a portable electronic product and capable of at least overcoming or partially overcoming at least one shortcoming in a conventional art.

One implementation mode of the disclosure, the disclosure provides a photographic optical system, which sequentially includes from an object side to an image side along an optical axis, a first lens, a second lens, a third lens, a fourth lens, a fifth lens and a sixth lens, wherein the first lens may have a positive refractive power, an object-side surface thereof may be a convex surface, and an image-side surface may be a concave surface; the second lens may have a negative refractive power, an object-side surface thereof may be a convex surface, and an image-side surface may be a concave surface; the third lens may have a refractive power; the fourth lens may have a refractive power; the fifth lens may have a positive refractive power; the sixth lens may have a negative refractive power, and an object-side surface thereof may be a concave surface. Wherein TTL is a distance from the object-side surface of the first lens to an imaging surface of the photographic optical system on the optical axis and ImgH is a half the diagonal length of an effective pixel area on the imaging surface of the photographic optical system, and TTL and ImgH may satisfy TTL/ImgH<1.5.

In an implementation mode, a total effective focal length f of the photographic optical system and a maximum half-field of view (HFOV) of the photographic optical system may satisfy 4.6 mm<f*tan(HFOV)<7 mm.

In an implementation mode, an effective focal length f1 of the first lens and an effective focal length f6 of the sixth lens may satisfy −2.5<f1/f6<−1.5.

In an implementation mode, an effective focal length f2 of the second lens and an effective focal length f5 of the fifth lens may satisfy −2.5<f2/(f5*2)<−1.5.

In an implementation mode, a curvature radius R1 of an object-side surface of the first lens and a curvature radius R4 of an image-side surface of the second lens may satisfy 1<R4/R1<2.

In an implementation mode, a curvature radius R3 of an object-side surface of the second lens and a curvature radius R11 of an object-side surface of the sixth lens may satisfy −2.5<R3/R11<−1.

In an implementation mode, a center thickness CT1 of the first lens on the optical axis, a center thickness CT2 of the second lens on the optical axis and a center thickness CT3 of the third lens on the optical axis may satisfy 1<CT1/(CT2+CT3)<1.5.

In an implementation mode, a spacing distance T56 of the fifth lens and the sixth lens on the optical axis and a spacing distance T23 of the second lens and the third lens on the optical axis may satisfy 0.6<T56/T23<1.2.

In an implementation mode, SAG52 is an on-axis distance from an intersection point of an image-side surface of the fifth lens and the optical axis to a vertex of an effective semi-diameter of an image-side surface of the fifth lens, and SAG52 and a center thickness CT5 of the fifth lens on the optical axis may satisfy 1<|SAG52/CT5|<1.5.

In an implementation mode, an edge thickness ET6 of the sixth lens and a center thickness CT6 of the sixth lens on the optical axis may satisfy 1<ET6/CT6<2.

In an implementation mode, a total effective focal length f of the photographic optical system and an entrance pupil diameter (EPD) of the photographic optical system may satisfy f/EPD<1.8.

Another implementation mode of the disclosure provides a photographic optical system, which sequentially includes from an object side to an image side along an optical axis: a first lens, a second lens, a third lens, a fourth lens, a fifth lens and a sixth lens, wherein the first lens may have a positive refractive power, an object-side surface thereof may be a convex surface, and an image-side surface may be a concave surface; the second lens may have a negative refractive power, an object-side surface thereof may be a convex surface, and an image-side surface may be a concave surface; the third lens may have a refractive power; the fourth lens may have a refractive power; the fifth lens may have a positive refractive power; the sixth lens may have a negative refractive power, and an object-side surface thereof may be a concave surface; and SAG52 is an on-axis distance from an intersection point of an image-side surface of the fifth lens and the optical axis to a vertex of an effective semi-diameter of the image-side surface of the fifth lens, and SAG52 and a center thickness CT5 of the fifth lens on the optical axis may satisfy 1<|SAG52/CT5|<1.5.

Another implementation mode of the disclosure provides a photographic optical system, which sequentially includes from an object side to an image side along an optical axis: a first lens, a second lens, a third lens, a fourth lens, a fifth lens and a sixth lens, wherein the first lens may have a positive refractive power, an object-side surface thereof may be a convex surface, and an image-side surface may be a concave surface; the second lens may have a negative refractive power, an object-side surface thereof may be a convex surface, and an image-side surface may be a concave surface; the third lens may have a refractive power; the fourth lens may have a refractive power; the fifth lens may have a positive refractive power; the sixth lens may have a negative refractive power, and an object-side surface thereof may be a concave surface; and an edge thickness ET6 of the sixth lens and a center thickness CT6 of the sixth lens on the optical axis may satisfy 1<ET6/CT6<2.

According to the disclosure, six lenses are adopted, and the refractive power of each lens, a surface type, a center thickness of each lens, on-axis spaces between the lenses and the like are reasonably configured to achieve at least one beneficial effect of ultra-small thickness, large aperture, large image surface, high imaging quality and the like of the photographic optical system.

BRIEF DESCRIPTION OF THE DRAWINGS

Detailed descriptions are made to unrestrictive embodiments below in combination with the drawings to make the other characteristics, purposes and advantages of the disclosure more apparent. In the accompanying drawings.

DETAILED DESCRIPTION OF THE EMBODIMENTS

Figure 1:
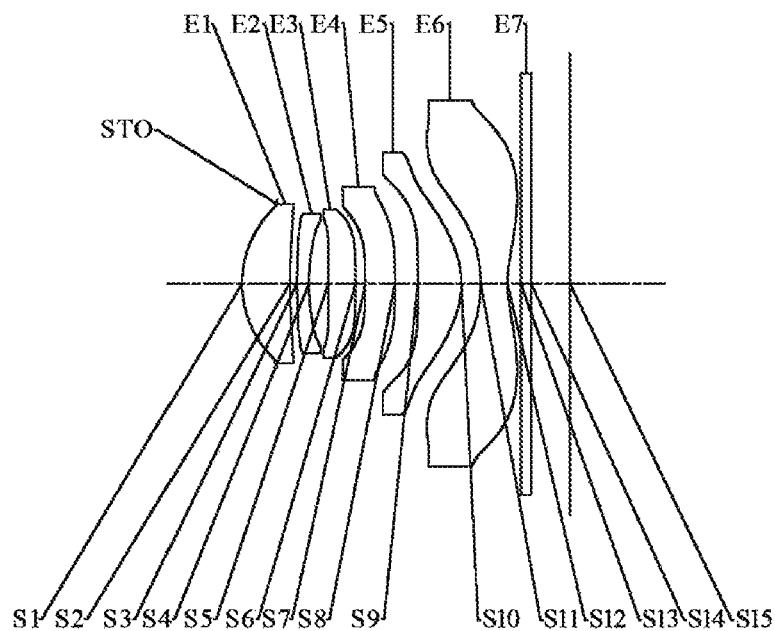
FIG. 1 shows a schematic structural diagram of a photographic optical system according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

A photographic optical system according to an exemplary embodiment of the disclosure may include, for example, six lenses with refractive power, i.e., a first lens, a second lens, a third lens, a fourth lens, a fifth lens and a sixth lens. The six lenses are sequentially arranged from an object side to an image side along an optical axis, and there may be air spaces between adjacent lenses.

In an exemplary embodiment, the first lens may have a positive refractive power, an object-side surface thereof may be a convex surface, and an image-side surface may be a concave surface; the second lens may have a negative refractive power, an object-side surface thereof may be a convex surface, and an image-side surface may be a concave surface; the third lens may have a positive refractive power or a negative refractive power; the fourth lens may have a positive refractive power or a negative refractive power; the fifth lens may have a positive refractive power; and the sixth lens may have a negative refractive power, and an object-side surface thereof may be a concave surface.

Reasonably controlling the refractive power and surface types of the first lens and the second lens is favorable for reducing an aberration of an on-axis field of view of the system and achieve high on-axis imaging performance of the system. Reasonably matching the third lens, the fourth lens and the fifth lens is favorable for balancing a high-order aberration generated by the lenses and make an aberration in each field of view of the system relatively small. Controlling a surface type of the object-side surface of the sixth lens to be a concave surface is favorable for matching primary light and image surface of the system.

In an exemplary embodiment, an object-side surface of the third lens may be a convex surface.

In an exemplary embodiment, an object-side surface of the fifth lens may be a convex surface, and an image-side surface may be a convex surface.

In an exemplary embodiment, an image-side surface of the sixth lens may be a concave surface.

In an exemplary embodiment, the photographic optical system of the disclosure may satisfy a conditional expression 4.6 mm<f*tan(HFOV)<7 mm, where f is a total effective focal length of the photographic optical system, and HFOV is a maximum half-field of view of the photographic optical system. More specifically, f and HFOV may further satisfy 4.6 mm<f*tan(HFOV)≤5.0 mm, for example, 4.64 mm≤f*tan(HFOV)≤4.71 mm. The total effective focal length and maximum half-field of view of the photographic optical system may be restricted to achieving an imaging effect of large image surface of the system.

In an exemplary embodiment, the photographic optical system of the disclosure may satisfy a conditional expression TTL/ImgH<1.5, wherein TTL is a distance from the object-side surface of the first lens to an imaging surface of the photographic optical system on the optical axis, and ImgH is a half the diagonal length of an effective pixel area on the imaging surface of the photographic optical system. More specifically, TTL and ImgH may further satisfy 1.40≤TTL/ImgH≤1.42. A ratio of the on-axis distance from the object-side surface of the first lens to the imaging surface to an image height may be restricted to achieve the characteristic of ultra-small thickness of the system.

In an exemplary embodiment, the photographic optical system of the disclosure may satisfy a conditional expression −2.5<f1/f6<−1.5, wherein f1 is an effective focal length of the first lens, and f6 is an effective focal length of the sixth lens. More specifically, f1 and f6 may further satisfy −2.12≤f1/f6≤−1.71. A ratio of the effective focal lengths of the first lens and the sixth lens may be controlled to reasonably distribute refractive power of the system to cancel out positive and negative spherical aberrations of a previous lens set and a next lens set.

In an exemplary embodiment, the photographic optical system of the disclosure may satisfy a conditional expression −2.5<f2/(f5*2)<−1.5, wherein f2 is an effective focal length of the second lens, and f5 is an effective focal length of the fifth lens. More specifically, f2 and f5 may further satisfy −2.19≤f2/(f5*2)≤−1.55. Reasonably configuring the refractive power of the second lens and the fifth lens to control a ratio of the effective focal lengths of the second lens and the fifth lens in a certain range is favorable for balancing an off-axis aberration of the photographic optical system.

In an exemplary embodiment, the photographic optical system of the disclosure may satisfy a conditional expression 1<|SAG52/CT5|<1.5, wherein SAG52 is an on-axis distance from an intersection point of an image-side surface of the fifth lens and the optical axis to a vertex of an effective semi-diameter of the image-side surface of the fifth lens, and CT5 is a center thickness of the fifth lens on the optical axis. More specifically, SAG52 and CT5 may further satisfy 1.17≤|SAG52/CT5|≤1.36. Satisfying the conditional expression 1<|SAG52/CT5|<1.5 may effectively reduce an incidence angle of the primary light on the image-side surface of the fifth lens, thereby effectively improving a matching degree of the optical system and a chip.

In an exemplary embodiment, the photographic optical system of the disclosure may satisfy a conditional expression 1<ET6/CT6<2, wherein ET6 is an edge thickness of the first lens, and CT6 is a center thickness of the sixth lens on the optical axis. More specifically, ET6 and CT6 may further satisfy 1.12≤ET6/CT6≤1.60. A ratio of the edge thickness to the center thickness of the sixth length is reasonably controlled to make the photographic optical system high in manufacturability and easy to machine and manufacture.

In an exemplary embodiment, the photographic optical system of the disclosure may satisfy a conditional expression 1<R4/R1<2, wherein R1 is a curvature radius of the object-side surface of the first lens, and R4 is a curvature radius of the image-side surface of the second lens. More specifically, R4 and R1 may further satisfy 1.46≤R4/R1≤1.81. A ratio of the curvature radius of an image-side surface of the fourth lens to the curvature radius of the object-side surface of the first lens may be reasonably controlled to effectively balance the on-axis aberration generated by the photographic optical system.

In an exemplary embodiment, the photographic optical system of the disclosure may satisfy a conditional expression −2.5<R3/R11<−1, wherein R3 is a curvature radius of the object-side surface of the second lens, and R11 is a curvature radius of the object-side surface of the sixth lens. More specifically, R3 and R11 may further satisfy −2.32≤R3/R11≤−1.44. A ratio of the curvature radii of the object-side surface of the second lens and the object-side surface of the sixth lens may be controlled to control a light angle of an edge field of view in a reasonable range, thereby effectively reducing the sensitivity of the system.

In an exemplary embodiment, the photographic optical system of the disclosure may satisfy a conditional expression 0.6>T56/T23<1.2, wherein T56 is a spacing distance of the fifth lens and the sixth lens on the optical axis, and T23 is a spacing distance of the second lens and the third lens on the optical axis. More specifically, T56 and T23 may further satisfy 0.77≤T56/T23≤1.14. An air gap of the fifth lens and the sixth lens and an air gap of the second lens and the third lens may be restricted to balance a field curvature generated by the previous lens set of the system and a field curvature generated by the next lens set to achieve a reasonable field curvature of the system.

In an exemplary embodiment, the photographic optical system of the disclosure may satisfy a conditional expression 1<CT1/(CT2+CT3)<1.5, wherein CT1 is a center thickness of the first lens on the optical axis, CT2 is a center thickness of the second lens on the optical axis, and CT3 is a center thickness of the third lens on the optical axis. More specifically, CT1, CT2 and CT3 may further satisfy 1.18<CT1/(CT2+CT3)≤1.36. A ratio of the center thickness of the first lens to a sum of the center thicknesses of the second lens and the third lens may be reasonably controlled to ensure that the optical system is high in manufacturability and ensure that the on-axis distance from the object-side surface of the first lens to the imaging surface of the optical system is controlled in a certain range.

In an exemplary embodiment, the photographic optical system of the disclosure may satisfy a conditional expression f/EPD<1.8, wherein f is a total effective focal length of the photographic optical system, and EPD is an entrance pupil diameter of the photographic optical system. More specifically, f and EPD may further satisfy 1.65≤f/EPD≤1.75, for example, 1.69≤f/EPD≤1.70. The conditional expression f/EPD<1.8 is satisfied, so that the photographic optical system has the characteristic of relatively large aperture, a luminous flux of the system in unit time may be increased, an imaging effect in a dark environment may be enhanced, and meanwhile, the aberration of the edge field of view may be reduced.

In an exemplary embodiment, the photographic optical system may further include a diaphragm to improve the imaging quality of the optical system. It is understood by those skilled in the art that the diaphragm may be arranged at any position as required. For example, the diaphragm may be arranged between the object side and the first lens; or, the diaphragm may be arranged between the first lens and the second lens.

Optionally, the photographic optical system may further include an optical filter configured to correct a chromatic aberration and/or protective glass configured to protect a photosensitive element on the imaging surface.

The photographic optical system according to the embodiment of the disclosure may adopt multiple lenses, for example, the abovementioned six lenses. The refractive power of each lens, a surface type, a center thickness of each lens, on-axis spaces between the lenses and the like are reasonably configured to effectively reduce the size of the optical system, reduce the sensitivity of the optical system, improve the manufacturability of the optical system and ensure that the photographic optical system is more favorable for production and machining and may be applied to a portable electronic product. The photographic optical system configured as above may further have the beneficial effects of large image surface, large aperture, miniaturization, high imaging quality and the like.

In an embodiment of the disclosure, at least one of lens surfaces of each lens is an aspherical lens surface, namely at least one of an object-side surface and an image-side surface of each lens in the first lens, the second lens, the third lens, the fourth lens, the fifth lens and the sixth lens is an aspherical lens surface. An aspherical lens has the features that a curvature varies continuously from a center of the lens to a periphery of the lens. Unlike a spherical lens with a constant curvature from the center of the lens to the periphery of the lens, an aspherical lens has better curvature radius features and the advantages of improving distortion and improving astigmatic aberration. With adoption of the aspherical lens, the aberration during imaging may be eliminated as much as possible, thereby improving the imaging quality. Optionally, both the object-side surface and the image-side surface of each lens in the first lens, the second lens, the third lens, the fourth lens, the fifth lens and the sixth lens are aspherical lens surfaces.

However, those skilled in the art should know that the number of the lenses forming the photographic optical system may be changed without departing from the technical solutions claimed in the disclosure to achieve each result and advantage described in the specification. For example, although descriptions are made in the embodiment with six lenses as an example, the photographic optical system is not limited to six lenses. If necessary, the photographic optical system may further include another number of lenses.

Specific embodiments applied to the photographic optical system of the embodiment will further be described below with reference to the accompanying drawings.

Embodiment 1

A photographic optical system according to embodiment 1 of the disclosure will be described below with reference to FIG. 1 to FIG. 2D. FIG. 1 shows a schematic structural diagram of a photographic optical system according to embodiment 1 of the disclosure.

As shown in FIG. 1, the photographic optical system according to an exemplary embodiment of the disclosure sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a negative refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 1 shows the surface type, curvature radius, thickness, material and conic coefficient of each lens of the photographic optical system according to embodiment 1, wherein the units of the curvature radius and the thickness are both millimeter (mm).

TABLE 1

| Surface number | Surface type | Curvature radius | Thickness | Material Refractive index | Abbe number | Conic coefficient |
|---|---|---|---|---|---|---|
| OBJ | Sphere | Infinite | Infinite | | | |
| STO | Sphere | Infinite | −0.7110 | | | |
| S1 | Aspherical surface | 2.1851 | 0.9771 | 1.55 | 56.1 | 0.0027 |
| S2 | Aspherical surface | 8.7953 | 0.1428 | | | −73.0510 |
| S3 | Aspherical surface | 7.1197 | 0.2456 | 1.67 | 20.4 | −29.6990 |
| S4 | Aspherical surface | 3.9573 | 0.3956 | | | −2.6251 |
| S5 | Aspherical surface | 18.0808 | 0.5604 | 1.54 | 55.7 | −99.0000 |
| S6 | Aspherical surface | −88.8219 | 0.2018 | | | 99.0000 |
| S7 | Aspherical surface | −17.0729 | 0.6028 | 1.67 | 20.4 | 99.0000 |
| S8 | Aspherical surface | −48.1719 | 0.4634 | | | 99.0000 |
| S9 | Aspherical surface | 256.4264 | 0.8946 | 1.55 | 56.1 | 99.0000 |
| S10 | Aspherical surface | −1.7337 | 0.3933 | | | −5.0926 |
| S11 | Aspherical surface | −3.1363 | 0.5475 | 1.54 | 55.7 | −3.6149 |
| S12 | Aspherical surface | 2.3584 | 0.2740 | | | −13.0482 |
| S13 | Sphere | Infinite | 0.2100 | 1.52 | 64.2 | |
| S14 | Sphere | Infinite | 0.7912 | | | |
| S15 | Sphere | Infinite | | | | |

As can be determined from Table 1, an object-side surface and an image-side surface of any one of the first lens E1 to the sixth lens E6 are all aspherical surfaces. In the embodiment, the surface type x of each aspherical lens may be defined by, but be not limited to, the following aspherical surface equation:

$$x = \frac{ch^2}{1 + \sqrt{1 - (k+1)c^2h^2}} + \sum A_i h^i \quad (1)$$

wherein, x is the distance vector height from a vertex of the aspherical surface when the aspherical surface is at a height of h along the optical axis direction; c is the paraxial curvature of the aspherical surface, c=1/R (that is, the paraxial curvature c is the reciprocal of the curvature radius R in Table 1 above); k is the conic coefficient (given in Table 1); and Ai is the correction coefficient of the i-th order of the aspherical surface. Table 2 shows the higher order term coefficients $A_4$, $A_6$, $A_8$, $A_{10}$, $A_{12}$, $A_{14}$, $A_{16}$, $A_{18}$ and $A_{20}$ that can be used for each of aspherical lens surfaces S1-S12 in embodiment 1.

TABLE 2

| Surface number | A4 | A6 | A8 | A10 | A12 | A14 | A16 | A18 | A20 |
|---|---|---|---|---|---|---|---|---|---|
| S1 | −1.4304E−03 | 8.6937E−03 | −1.7385E−02 | 2.2318E−02 | −1.8171E−02 | 9.3766E−03 | −2.9888E−03 | 5.3601E−04 | −4.2198E−05 |
| S2 | −1.9305E−02 | 1.8495E−02 | −1.2501E−02 | 1.3562E−02 | −1.7028E−02 | 1.3575E−02 | −6.2576E−03 | 1.5410E−03 | −1.5763E−04 |
| S3 | −6.4995E−02 | 6.1193E−02 | −2.4692E−02 | 1.8002E−02 | −3.1170E−02 | 3.2239E−02 | −1.7531E−02 | 4.9060E−03 | −5.5950E−04 |
| S4 | −4.6805E−02 | 6.0452E−02 | −5.5829E−02 | 1.1431E−01 | −1.8116E−01 | 1.7141E−01 | −9.3332E−02 | 2.7227E−02 | −3.2650E−03 |
| S5 | −3.5567E−02 | 1.9088E−02 | −4.6905E−02 | 6.4179E−02 | −6.2094E−02 | 3.8300E−02 | −1.4397E−02 | 2.8259E−03 | −1.9255E−04 |
| S6 | −6.0548E−02 | 2.2490E−02 | −5.5819E−02 | 8.1464E−02 | −8.7056E−02 | 6.0591E−02 | −2.5833E−02 | 6.1451E−03 | −6.2619E−04 |
| S7 | −7.3371E−02 | 2.1583E−02 | −3.8994E−02 | 5.5579E−02 | −5.7388E−02 | 3.8509E−02 | −1.5642E−02 | 3.5511E−03 | −3.4823E−04 |
| S8 | −5.8456E−02 | 2.9089E−02 | −3.7065E−02 | 3.6498E−02 | −2.3374E−02 | 9.6348E−03 | −2.4647E−03 | 3.5555E−04 | −2.1927E−05 |
| S9 | −2.5423E−02 | 7.7336E−05 | 6.6994E−04 | −2.1733E−03 | 1.0800E−03 | −9.5867E−05 | −6.6958E−05 | 1.9214E−05 | −1.4822E−06 |
| S10 | −3.6454E−02 | 1.3530E−02 | −3.4348E−03 | −1.0883E−03 | 9.2497E−04 | −2.0948E−04 | 1.9551E−05 | −5.4985E−07 | −1.1891E−08 |
| S11 | −5.1822E−02 | 2.4423E−02 | −1.2209E−02 | 4.2176E−03 | −8.4210E−04 | 9.9621E−05 | −6.9863E−06 | 2.7029E−07 | −4.4678E−09 |
| S12 | −3.2057E−02 | 1.1499E−02 | −3.5690E−03 | 7.8497E−04 | −1.1952E−04 | 1.2161E−05 | −7.8491E−07 | 2.8887E−08 | −4.5800E−10 |

Table 3 shows effective focal lengths f1 to f6 of the lenses in embodiment 1, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 3

| | |
|---|---|
| f1 (mm) | 5.06 |
| f2 (mm) | −13.79 |
| f3 (mm) | 28.04 |
| f4 (mm) | −39.96 |
| f5 (mm) | 3.16 |
| f6 (mm) | −2.42 |
| f (mm) | 5.50 |
| TTL (mm) | 6.70 |
| ImgH (mm) | 4.75 |

The photographic optical system in embodiment 1 satisfies:

f*tan(HFOV)=4.64, wherein f is the total effective focal length of the photographic optical system, and HFOV is a maximum half-field of view of the photographic optical system;

TTL/ImgH=1.41, wherein TTL is the distance from the object-side surface S1 of the first lens E1 to the imaging surface S15 on the optical axis, and ImgH is the half the diagonal length of the effective pixel area on the imaging surface S15;

f1/f6=−2.09, wherein f1 is an effective focal length of the first lens E1, and f6 is an effective focal length of the sixth lens E6;

f2/(f5*2)=−2.18, wherein f2 is an effective focal length of the second lens E2, and f5 is an effective focal length of the fifth lens E5;

|SAG52/CT5|=1.35, wherein SAG52 is an on-axis distance from an intersection point of the image-side surface S10 of the fifth lens E5 and the optical axis to a vertex of an effective semi-diameter of the image-side surface S10 of the fifth lens E5, and CT5 is a center thickness of the fifth lens E5 on the optical axis;

ET6/CT6=1.60, wherein ET6 is an edge thickness of the sixth lens E6, and CT6 is a center thickness of the sixth lens E6 on the optical axis;

R4/R1=1.81, wherein R1 is a curvature radius of the object-side surface S1 of the first lens E1, and R4 is a curvature radius of the image-side surface S4 of the second lens E2;

R3/R11=−2.27, wherein R3 is a curvature radius of the object-side surface S3 of the second lens E2, and R11 is a curvature radius of the object-side surface S11 of the sixth lens E6;

T56/T23=0.99, wherein T56 is a spacing distance of the fifth lens E5 and the sixth lens E6 on the optical axis, and T23 is a spacing distance of the second lens E2 and the third lens E3 on the optical axis;

CT1/(CT2+CT3)=1.21, wherein CT1 is a center thickness of the first lens E1 on the optical axis, CT2 is a center thickness of the second lens E2 on the optical axis, and CT3 is a center thickness of the third lens E3 on the optical axis; and f/EPD=1.69, wherein f is the total effective focal length of the photographic optical system, and EPD is an entrance pupil diameter of the photographic optical system.

Figure 2A:
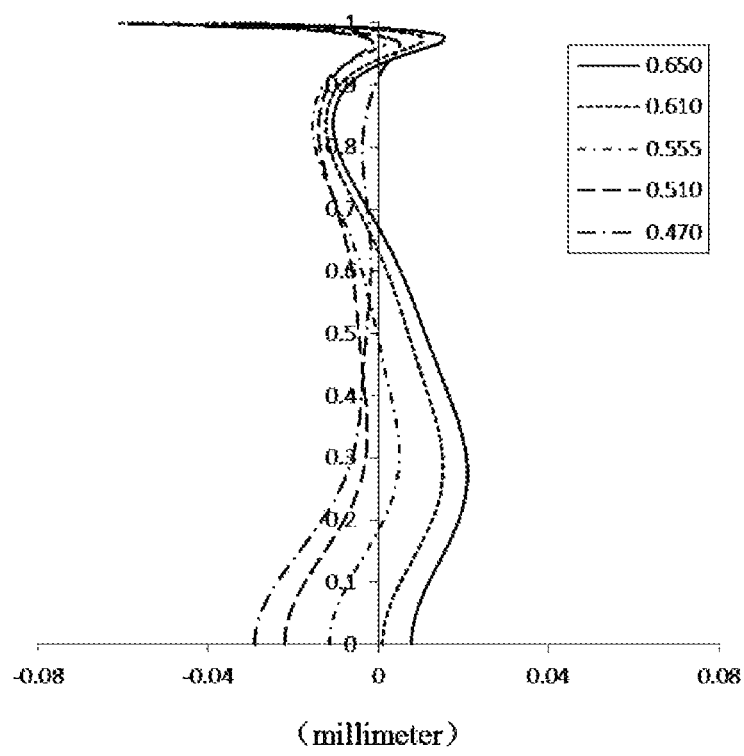
FIG. 2A to FIG. 2D show a longitudinal aberration curve, an astigmatism curve, a distortion curve and a lateral color curve of a photographic optical system according to embodiment 1 respectively.
Figure 2B:
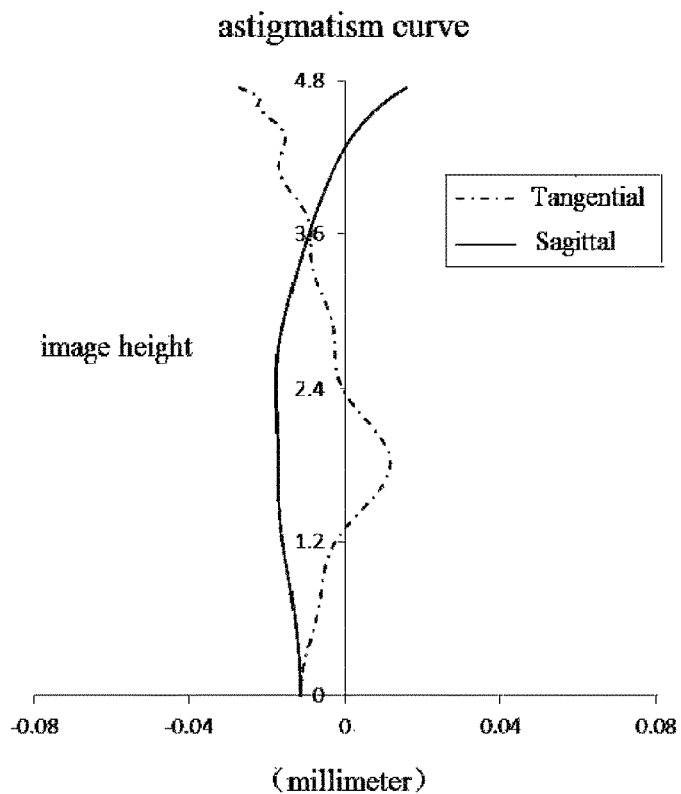
Figure 2C:
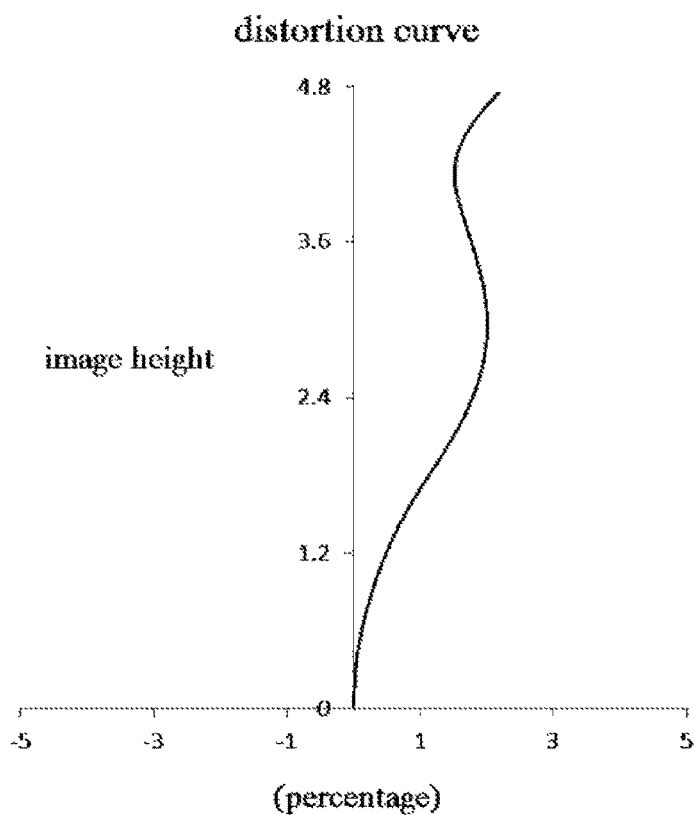
Figure 2D:
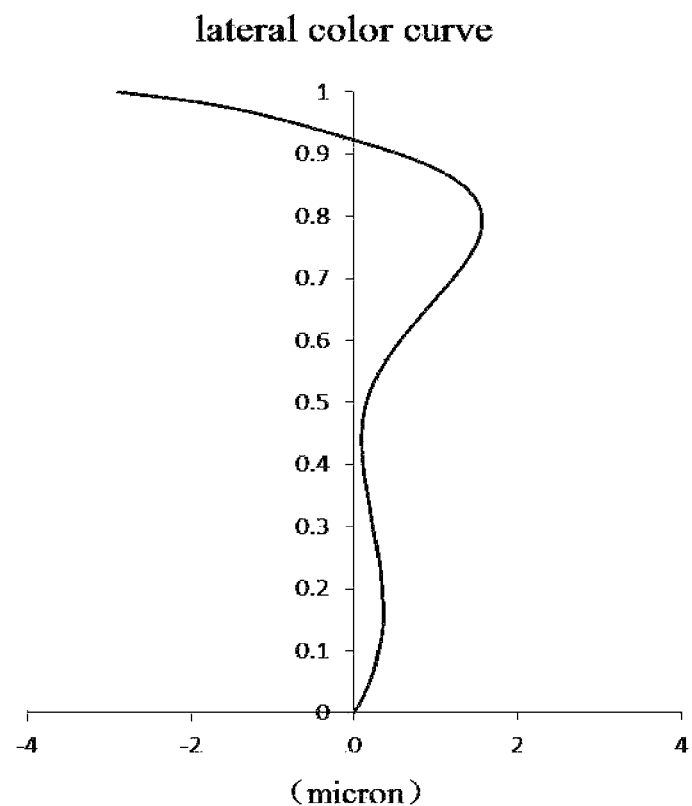

FIG. 2A shows a longitudinal aberration curve of the photographic optical system of embodiment 1, which represents convergence focus deviations of light rays of different wavelengths after passing through the system. FIG. 2B shows an astigmatism curve of the photographic optical system of embodiment 1, which represents a curvature of tangential image surface and a curvature of sagittal image surface. FIG. 2C shows a distortion curve of the photographic optical system of embodiment 1, which represents distortion values corresponding to different image heights. FIG. 2D shows a lateral color curve of the photographic optical system of embodiment 1, which represents deviations of light rays on different image heights of the imaging surface after passing through the system. According to FIG. 2A to FIG. 2D, the photographic optical system provided in embodiment 1 can achieve a good imaging quality.

Embodiment 2

Figure 3:
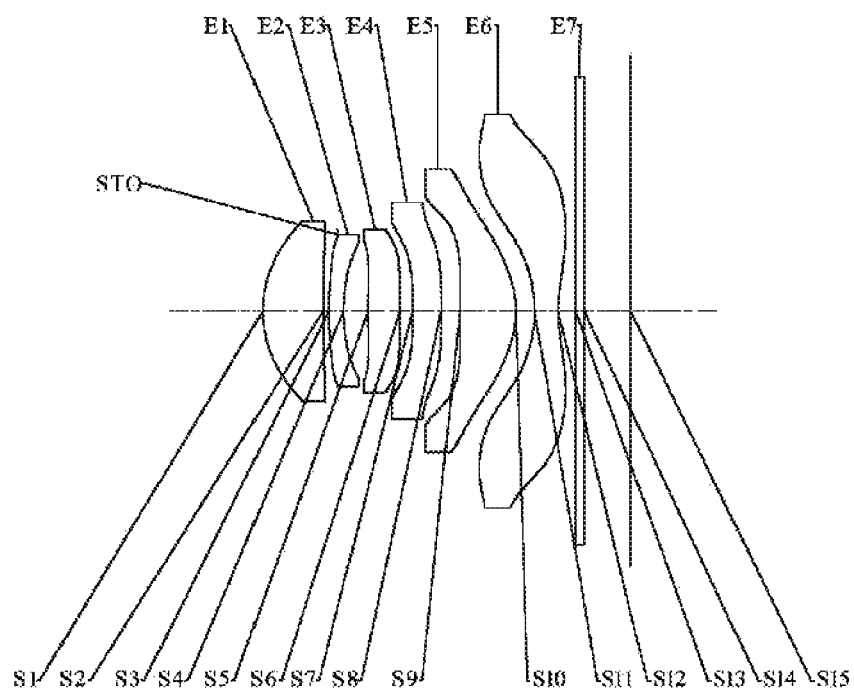
FIG. 3 shows a schematic structural diagram of a photographic optical system according to embodiment 2 of the disclosure.

A photographic optical system according to embodiment 2 of the disclosure will be described below with reference to FIG. 3 to FIG. 4D. In the embodiment and the following embodiments, for brevity, some description similar to embodiment 1 is omitted. FIG. 3 is a schematic structural diagram of a photographic optical system according to embodiment 2 of the disclosure.

As shown in FIG. 3, the photographic optical system according to an exemplary embodiment of the disclosure sequentially includes from an object side to an image side along an optical axis: a first lens E1, a diaphragm STO, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a negative refractive power, an object-side surface S7 thereof is a concave surface, and an image-side surface S8 is a concave surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 4 shows the surface type, curvature radius, thickness, material and conic coefficient of each lens of the photographic optical system according to embodiment 2, wherein the units of the curvature radius and the thickness are both millimeter (mm).

TABLE 4

| Surface number | Surface type | Curvature radius | Thickness | Material Refractive index | Material Abbe number | Conic coefficient |
|---|---|---|---|---|---|---|
| OBJ | Sphere | Infinite | Infinite | | | |
| S1 | Aspherical surface | 2.2234 | 1.1062 | 1.55 | 56.1 | −0.0611 |
| S2 | Aspherical surface | 15.8704 | 0.2728 | | | −97.6212 |
| STO | Sphere | Infinite | −0.1675 | | | |
| S3 | Aspherical surface | 6.0882 | 0.2708 | 1.67 | 20.4 | −8.3818 |
| S4 | Aspherical surface | 3.2488 | 0.4380 | | | −1.4864 |
| S5 | Aspherical surface | 15.4408 | 0.5819 | 1.54 | 55.7 | −88.9467 |
| S6 | Aspherical surface | 35.7470 | 0.2376 | | | 96.1952 |
| S7 | Aspherical surface | −21.0701 | 0.5227 | 1.67 | 20.4 | −92.0913 |
| S8 | Aspherical surface | 9263.2776 | 0.3341 | | | −99.0000 |
| S9 | Aspherical surface | 25.4006 | 1.0325 | 1.55 | 56.1 | −95.2008 |
| S10 | Aspherical surface | −1.6813 | 0.3388 | | | −5.4670 |
| S11 | Aspherical surface | −2.6979 | 0.4204 | 1.54 | 55.7 | −6.0075 |
| S12 | Aspherical surface | 2.6017 | 0.3208 | | | −15.1161 |
| S13 | Sphere | Infinite | 0.1621 | 1.52 | 64.2 | |
| S14 | Sphere | Infinite | | | | |
| S15 | Sphere | Infinite | | | | |

As can be determined from Table 4, in embodiment 2, the object-side surface and the image-side surface of any one of the first lens E1 to the sixth lens E6 are all aspherical surfaces. Table 5 shows high-order coefficients which can be used for each aspherical lens surfaces in embodiment 2, wherein each aspherical surface can be defined by equation (1) given in embodiment 1 above.

Table 6 shows effective focal lengths f1 to f6 of the lenses in embodiment 2, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 5

| Surface number | A4 | A6 | A8 | A10 | A12 |
|---|---|---|---|---|---|
| S1 | −8.6839E−04 | 1.7656E−03 | −1.2418E−03 | −7.7395E−04 | 1.8774E−03 |
| S2 | −2.7923E−02 | 3.8825E−02 | −2.9775E−02 | 1.0943E−02 | 9.4871E−04 |
| S3 | −5.5905E−02 | 6.6006E−02 | −1.7672E−02 | −4.7091E−02 | 8.1484E−02 |
| S4 | −3.2614E−02 | 3.0067E−02 | 6.2132E−02 | −2.1587E−01 | 3.4338E−01 |
| S5 | −2.5235E−02 | −2.0320E−02 | 9.3531E−02 | −2.7693E−01 | 4.6108E−01 |
| S6 | −3.4772E−02 | −2.7625E−02 | 7.8933E−02 | −1.4204E−01 | 1.4785E−01 |
| S7 | −6.5684E−02 | 1.6684E−02 | −1.8634E−02 | 2.4310E−02 | −2.0087E−02 |
| S8 | −6.5286E−02 | 1.9970E−02 | −2.0365E−02 | 2.3511E−02 | −1.6628E−02 |
| S9 | −2.9729E−02 | 7.6138E−03 | −2.3739E−02 | 2.3017E−02 | −1.2598E−02 |
| S10 | −2.0793E−02 | 1.0705E−02 | −1.4037E−02 | 7.9693E−03 | −2.2681E−03 |
| S11 | −2.7438E−02 | −1.7458E−02 | 1.2274E−02 | −3.0139E−03 | 4.0550E−04 |
| S12 | −3.6071E−02 | 8.3754E−03 | −1.2470E−03 | 6.7244E−05 | 9.1734E−06 |

| Surface number | A14 | A16 | A18 | A20 |
|---|---|---|---|---|
| S1 | −1.5028E−03 | 6.0968E−04 | −1.2917E−04 | 1.1026E−05 |
| S2 | −3.1714E−03 | 1.5118E−03 | −3.2770E−04 | 2.8216E−05 |
| S3 | −6.5346E−02 | 2.9927E−02 | −7.4789E−03 | 7.9620E−04 |
| S4 | −3.2635E−01 | 1.8860E−01 | −6.1117E−02 | 8.5692E−03 |
| S5 | −4.6713E−01 | 2.8295E−01 | −9.4468E−02 | 1.3401E−02 |
| S6 | −9.8975E−02 | 4.1494E−02 | −9.7910E−03 | 9.9344E−04 |
| S7 | 5.4894E−03 | 1.9420E−03 | −1.3021E−03 | 1.8511E−04 |
| S8 | 7.0431E−03 | −1.7037E−03 | 2.1562E−04 | −1.1058E−05 |
| S9 | 4.3051E−03 | −9.1596E−04 | 1.1040E−04 | −5.6708E−06 |
| S10 | 3.7211E−04 | −3.6470E−05 | 2.0125E−06 | −4.8630E−08 |
| S11 | −3.2828E−05 | 1.5963E−06 | −4.2914E−08 | 4.8797E−10 |
| S12 | −2.1142E−06 | 1.7598E−07 | −6.8108E−09 | 9.9945E−11 |

TABLE 6

| | |
|---|---|
| f1 (mm) | 4.60 |
| f2 (mm) | −10.86 |
| f3 (mm) | 50.14 |
| f4 (mm) | −31.52 |
| f5 (mm) | 2.93 |
| f6 (mm) | −2.40 |
| f (mm) | 5.63 |
| TTL (mm) | 6.72 |
| ImgH (mm) | 4.79 |

Figure 4A:
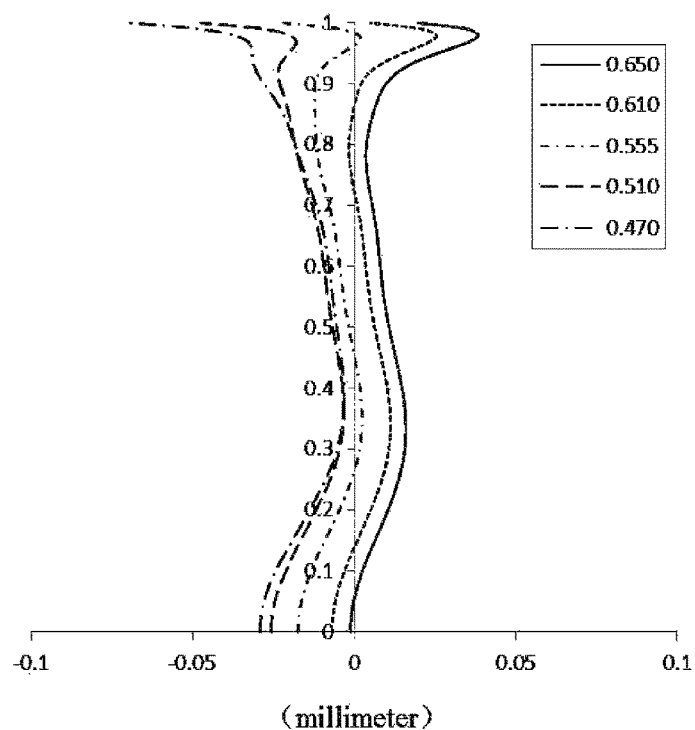
FIG. 4A to FIG. 4D show a longitudinal aberration curve, an astigmatism curve, a distortion curve and a lateral color curve of a photographic optical system according to embodiment 2 respectively.
Figure 4B:
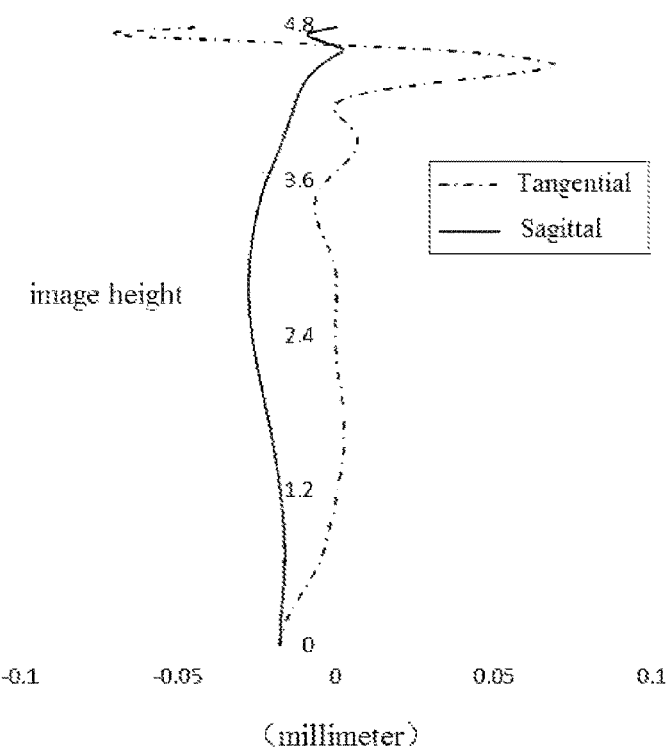
Figure 4C:
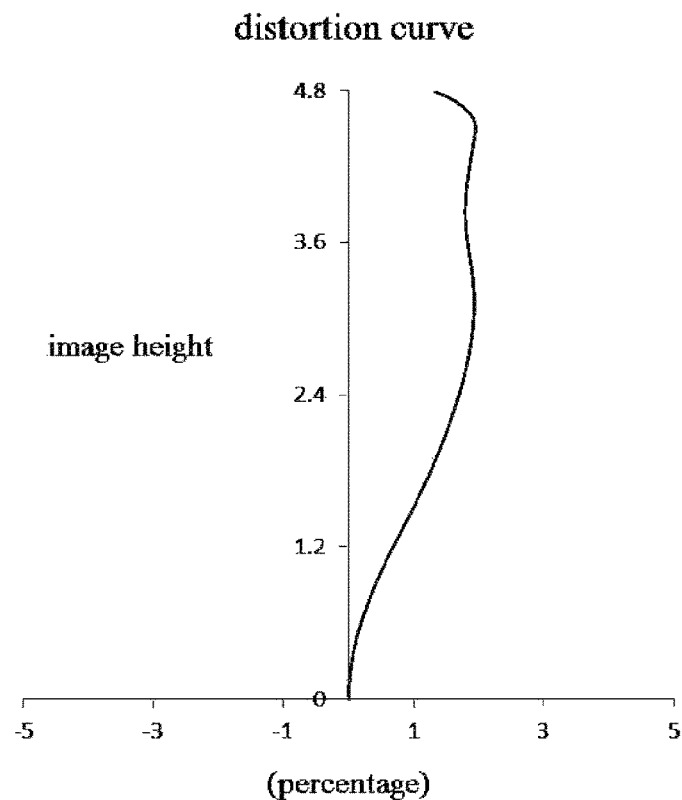
Figure 4D:
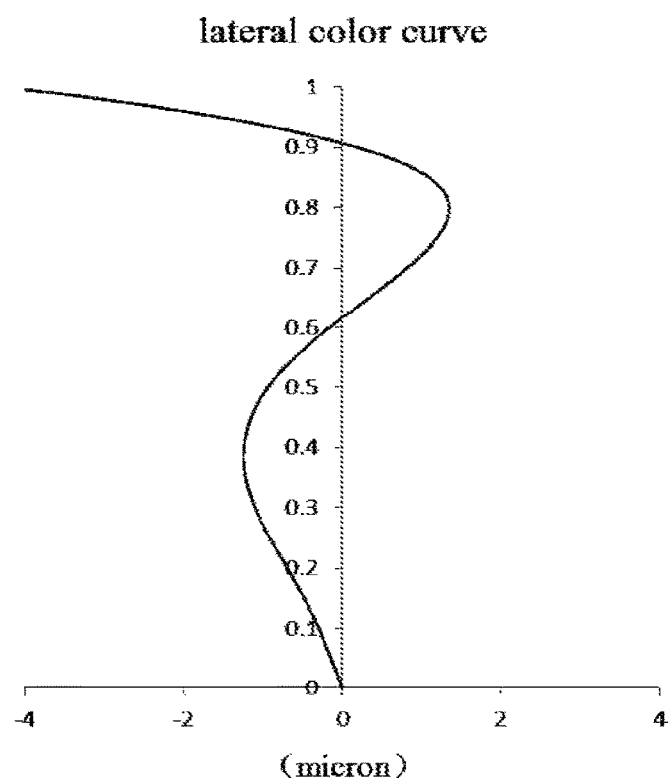

FIG. 4A shows a longitudinal aberration curve of the photographic optical system of embodiment 2, which represents convergence focus deviations of light rays of different wavelengths after passing through the system. FIG. 4B shows an astigmatism curve of the photographic optical system of embodiment 2, which represents a curvature of tangential image surface and a curvature of sagittal image surface. FIG. 4C shows a distortion curve of the photographic optical system of embodiment 2, which represents distortion values corresponding to different image heights. FIG. 4D shows a lateral color curve of the photographic optical system of embodiment 2, which represents deviations of light rays on different image heights of the imaging surface after passing through the system. According to FIG. 4A to FIG. 4D, the photographic optical system provided in embodiment 2 can achieve a good imaging quality.

Embodiment 3

Figure 5:
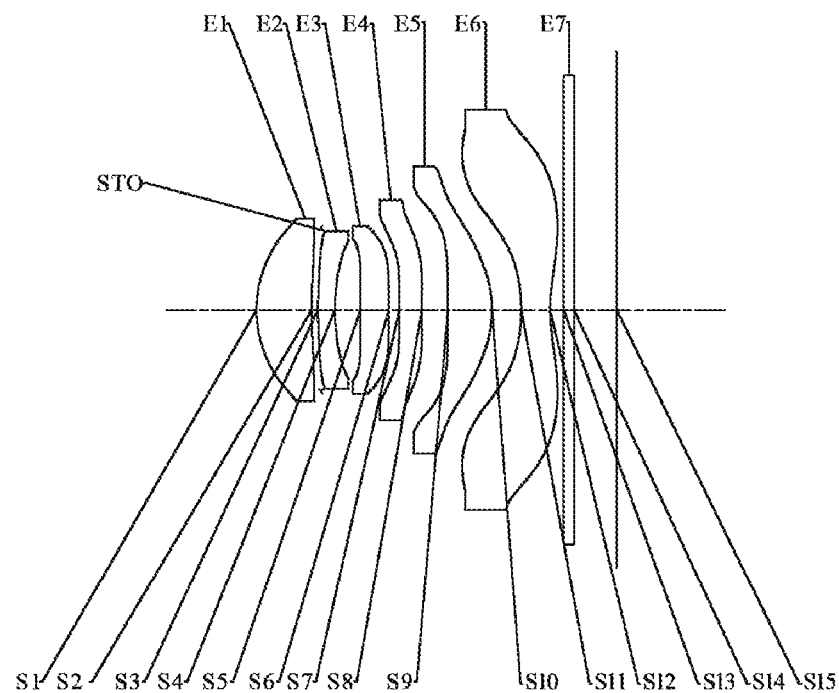
FIG. 5 shows a schematic structural diagram of a photographic optical system according to embodiment 3 of the disclosure.

A photographic optical system according to embodiment 3 of the disclosure will be described below with reference to FIG. 5 to FIG. 6D. FIG. 5 is a schematic structural diagram of a photographic optical system according to embodiment 3 of the disclosure.

As shown in FIG. 5, the photographic optical system according to an exemplary embodiment of the disclosure sequentially includes from an object side to an image side along an optical axis: a first lens E1, a diaphragm STO, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a positive refractive power, an object-side surface S7 thereof is a convex surface, and an image-side surface S8 is a concave surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 7 shows the surface type, curvature radius, thickness, material and conic coefficient of each lens of the photographic optical system according to embodiment 3, wherein the units of the curvature radius and the thickness are both millimeter (mm).

TABLE 7

| | | | | Material | | |
|---|---|---|---|---|---|---|
| Surface number | Surface type | Curvature radius | Thickness | Refractive index | Abbe number | Conic coefficient |
| OBJ | Sphere | Infinite | Infinite | | | |
| S1 | Aspherical surface | 2.2311 | 1.0293 | 1.55 | 56.1 | 0.0000 |
| S2 | Aspherical surface | 9.9575 | 0.1867 | | | 0.0000 |
| STO | Sphere | Infinite | −0.0709 | | | |
| S3 | Aspherical surface | 7.0475 | 0.3163 | 1.67 | 20.4 | 0.0000 |
| S4 | Aspherical surface | 3.6736 | 0.4779 | | | 0.0000 |
| S5 | Aspherical surface | 27.8107 | 0.5283 | 1.54 | 55.7 | 0.0000 |
| S6 | Aspherical surface | 54.3758 | 0.1952 | | | 0.0000 |
| S7 | Aspherical surface | 21.9991 | 0.4212 | 1.67 | 20.4 | 0.0000 |
| S8 | Aspherical surface | 23.0920 | 0.4814 | | | 0.0000 |
| S9 | Aspherical surface | 103.4419 | 0.8110 | 1.55 | 56.1 | 0.0000 |
| S10 | Aspherical surface | −2.0966 | 0.5445 | | | −1.0000 |
| S11 | Aspherical surface | −3.3265 | 0.5348 | 1.54 | 55.7 | −1.0000 |
| S12 | Aspherical surface | 3.1487 | 0.2584 | | | −1.0000 |
| S13 | Sphere | Infinite | 0.1900 | 1.52 | 64.2 | 0.0000 |
| S14 | Sphere | Infinite | 0.7960 | | | |
| S15 | Sphere | Infinite | | | | |

As can be determined from Table 7, in embodiment 3, the object-side surface and the image-side surface of any one of the first lens E1 to the sixth lens E6 are all aspherical surfaces. Table 8 shows high-order coefficients which can be used for each aspherical lens surfaces in embodiment 3, wherein each aspherical surface can be defined by equation (1) given in embodiment 1 above.

TABLE 8

| Surface number | A4 | A6 | A8 | A10 | A12 |
|---|---|---|---|---|---|
| S1  |  2.8455E−04 | −1.8415E−03 |  7.0305E−03 | −1.1812E−02 |  1.1270E−02 |
| S2  | −3.8962E−02 |  3.1139E−02 | −1.2208E−02 | −3.9811E−03 |  8.7146E−03 |
| S3  | −6.3514E−02 |  5.1538E−02 | −3.5825E−03 | −3.6181E−02 |  4.7611E−02 |
| S4  | −3.1107E−02 |  3.0066E−02 |  1.8587E−02 | −6.6870E−02 |  9.3919E−02 |
| S5  | −3.6172E−02 |  2.1062E−03 |  1.3706E−02 | −8.9816E−02 |  1.7057E−01 |
| S6  | −7.5125E−02 |  3.1859E−02 | −2.9536E−02 |  1.1341E−02 | −3.7043E−03 |
| S7  | −1.1104E−01 |  6.7344E−02 | −9.5790E−02 |  1.2969E−01 | −1.2133E−01 |
| S8  | −8.2078E−02 |  3.1259E−02 | −2.5790E−02 |  2.5249E−02 | −1.7216E−02 |
| S9  | −1.5898E−02 | −4.9669E−03 | −3.4240E−03 |  3.2894E−03 | −1.2374E−03 |
| S10 |  4.3050E−02 | −2.2919E−02 |  5.0019E−03 | −5.9588E−04 |  1.8852E−04 |
| S11 | −1.5253E−02 | −1.5956E−02 |  8.5110E−03 | −1.5257E−03 |  1.1588E−04 |
| S12 | −6.8582E−02 |  1.78825E−02 | −4.0525E−03 |  7.2327E−04 | −9.7784E−05 |

| Surface number | A14 | A16 | A18 | A20 |
|---|---|---|---|---|
| S1  | −6.4869E−03 |  2.2060E−03 | −4.0991E−04 |  3.1586E−05 |
| S2  | −5.8702E−03 |  2.1461E−03 | −4.2362E−04 |  3.5426E−05 |
| S3  | −3.3413E−02 |  1.4103E−02 | −3.3307E−03 |  3.3940E−04 |
| S4  | −8.1854E−02 |  4.5446E−02 | −1.4526E−02 |  2.0412E−03 |
| S5  | −1.7837E−01 |  1.0639E−01 | −3.4057E−02 |  4.5319E−03 |
| S6  |  9.7024E−04 |  3.1955E−04 | −2.8116E−04 |  4.7835E−05 |
| S7  |  7.0317E−02 | −2.3722E−02 |  4.2774E−03 | −3.2002E−04 |
| S8  |  7.3954E−03 | −1.9019E−03 |  2.6867E−04 | −1.6046E−05 |
| S9  |  3.0617E−04 | −6.8124E−05 |  1.1216E−05 | −7.8322E−07 |
| S10 | −3.7969E−05 |  6.5508E−07 |  4.7688E−07 | −3.3748E−08 |
| S11 | −1.0394E−07 | −6.0884E−07 |  4.0038E−08 | −8.6204E−10 |
| S12 |  9.4565E−06 | −6.0929E−07 |  2.3160E−08 | −3.8677E−10 |

Table 9 shows effective focal lengths f1 to f6 of the lenses in embodiment 3, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 9

| | |
|---|---|
| f1 (mm) | 5.03 |
| f2 (mm) | −11.95 |
| f3 (mm) | 105.32 |
| f4 (mm) | 603.85 |
| f5 (mm) | 3.77 |
| f6 (mm) | −2.93 |
| f (mm) | 5.60 |
| TTL (mm) | 6.70 |
| ImgH (mm) | 4.79 |

Figure 6A:
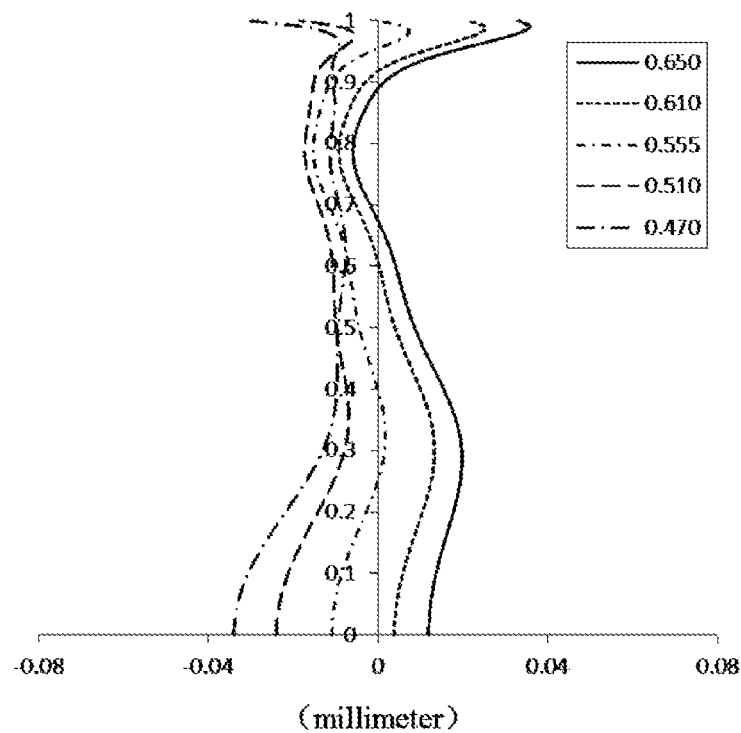
FIG. 6A to FIG. 6D show a longitudinal aberration curve, am astigmatism curve, a distortion curve and a lateral color curve of a photographic optical system according to embodiment 3 respectively.
Figure 6B:
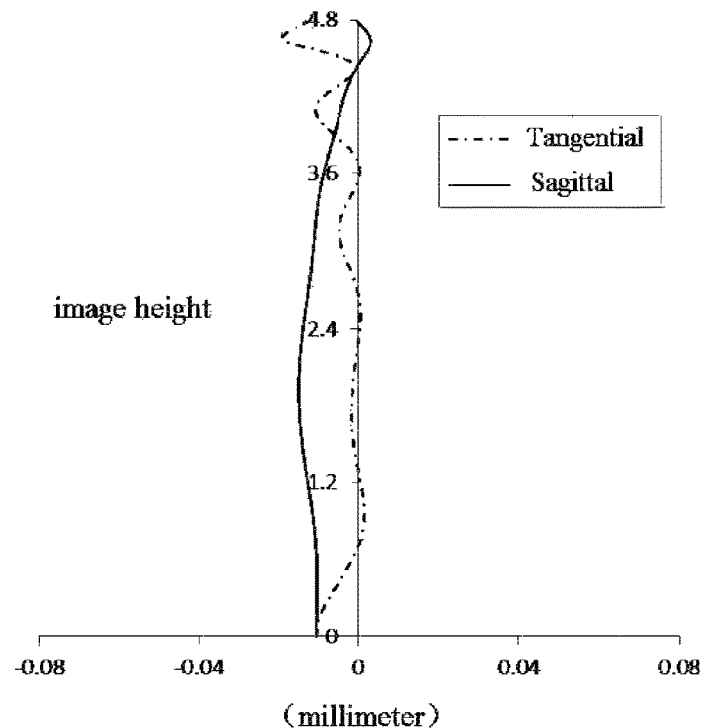
Figure 6C:
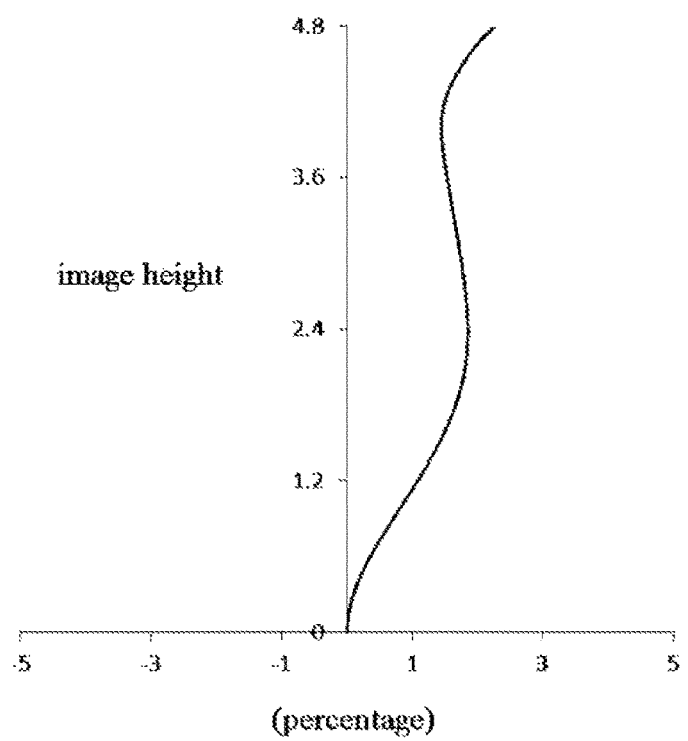
Figure 6D:
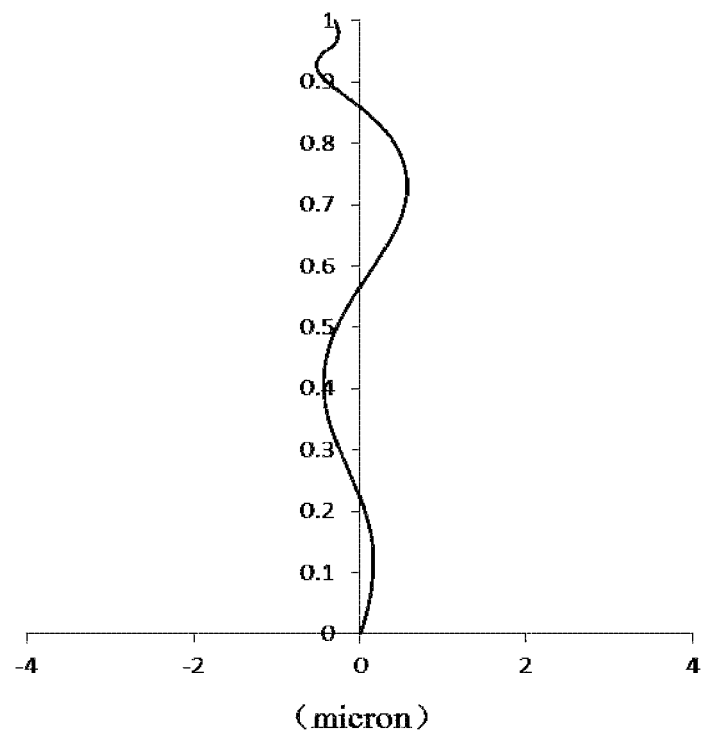

FIG. 6A shows a longitudinal aberration curve of the photographic optical system of embodiment 3, which represents convergence focus deviations of light rays of different wavelengths after passing through the system. FIG. 6B shows an astigmatism curve of the photographic optical system of embodiment 3, which represents a curvature of tangential image surface and a curvature of sagittal image surface. FIG. 6C shows a distortion curve of the photographic optical system of embodiment 3, which represents distortion values corresponding to different image heights. FIG. 6D shows a lateral color curve of the photographic optical system of embodiment 3, which represents deviations of light rays on different image heights of the imaging surface after passing through the system. According to FIG. 6A to FIG. 6D, the photographic optical system provided in embodiment 3 can achieve a good imaging quality.

Embodiment 4

Figure 7:
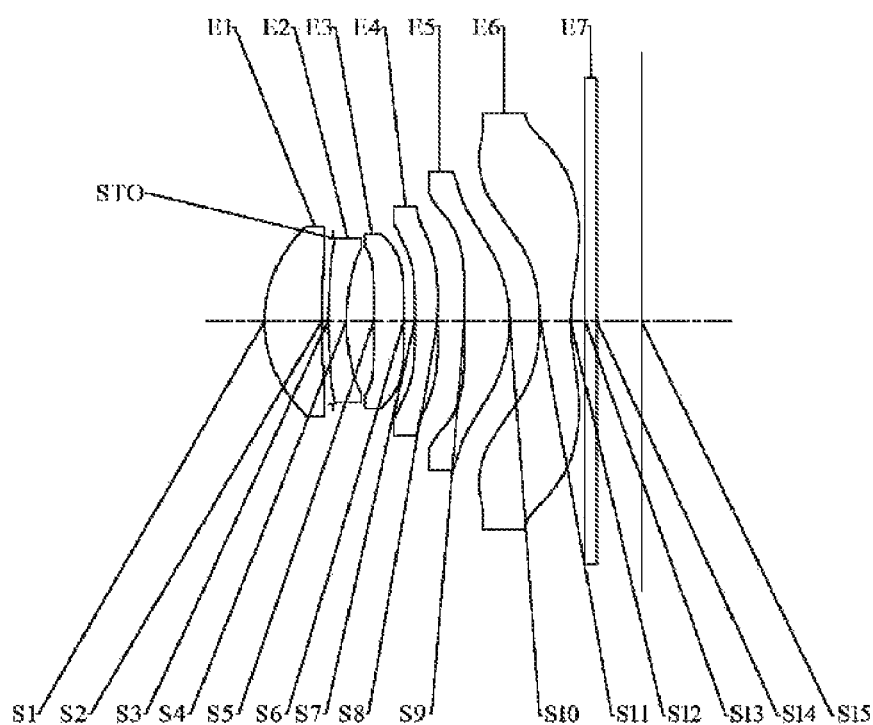
FIG. 7 shows a schematic structural diagram of a photographic optical system according to embodiment 4 of the disclosure.

A photographic optical system according to embodiment 4 of the disclosure will be described below with reference to FIG. 7 to FIG. 8D. FIG. 7 is a schematic structural diagram of a photographic optical system according to embodiment 4 of the disclosure.

As shown in FIG. 7, the photographic optical system according to an exemplary embodiment of the disclosure sequentially includes, from an object side to an image side along an optical axis, a first lens E1, a diaphragm STO, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a positive refractive power, an object-side surface S7 thereof is a convex surface, and an image-side surface S8 is a concave surface. The fifth lens E5 has a positive refractive power, an object-side surface 39 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 10 shows the surface type, curvature radius, thickness, material and conic coefficient of each lens of the photographic optical system according to embodiment 4, wherein the units of the curvature radius and the thickness are both millimeter (mm).

TABLE 10

| Surface number | Surface type | Curvature radius | Thickness | Material Refractive index | Abbe number | Conic coefficient |
|---|---|---|---|---|---|---|
| OBJ | Sphere | Infinite | Infinite | | | |
| S1 | Aspherical surface | 2.2394 | 1.0221 | 1.55 | 56.1 | −0.0061 |
| S2 | Aspherical surface | 10.4465 | 0.1830 | | | −0.0102 |
| STO | Sphere | Infinite | −0.0717 | | | |
| S3 | Aspherical surface | 7.0434 | 0.3266 | 1.67 | 20.4 | 0.1557 |
| S4 | Aspherical surface | 3.6193 | 0.4811 | | | 0.0814 |
| S5 | Aspherical surface | 27.8492 | 0.5360 | 1.54 | 55.7 | −33.7100 |
| S6 | Aspherical surface | 62.2704 | 0.1979 | | | −99.0000 |
| S7 | Aspherical surface | 20.9546 | 0.4046 | 1.67 | 20.4 | −0.2684 |
| S8 | Aspherical surface | 22.2142 | 0.4785 | | | −9.8307 |
| S9 | Aspherical surface | 412.8754 | 0.8075 | 1.55 | 56.1 | 99.0000 |
| S10 | Aspherical surface | −2.0583 | 0.5332 | | | −1.0101 |
| S11 | Aspherical surface | −3.6290 | 0.5372 | 1.54 | 55.7 | −0.0008 |
| S12 | Aspherical surface | 2.9069 | 0.2582 | | | −0.9910 |
| S13 | Sphere | Infinite | 0.2100 | 1.52 | 64.2 | |
| S14 | Sphere | Infinite | 0.7959 | | | |
| S15 | Sphere | Infinite | | | | |

As can be determined from Table 10, in embodiment 4, the object-side surface and the image-side surface of any one of the first lens E1 to the sixth lens E6 are all aspherical surfaces. Table 11 shows high-order coefficients which can be used for each aspherical lens surfaces in embodiment 4, wherein each aspherical surface can be defined by equation (1) given in embodiment 1 above.

TABLE 11

| Surface number | A4 | A6 | A8 | A10 | A12 |
|---|---|---|---|---|---|
| S1 | 2.8455E−04 | −1.8415E−03 | 7.0305E−03 | −1.1812E−02 | 1.1270E−02 |
| S2 | −3.8962E−02 | 3.1139E−02 | −1.2208E−02 | −3.9811E−03 | 8.7146E−03 |
| S3 | −6.3514E−02 | 5.1538E−02 | −3.5825E−03 | −3.6181E−02 | 4.7611E−02 |
| S4 | −3.1107E−02 | 3.0066E−02 | 1.8587E−02 | −6.6870E−02 | 9.3919E−02 |
| S5 | −3.6172E−02 | 2.1062E−03 | 1.3706E−02 | −8.9816E−02 | 1.7057E−01 |
| S6 | −7.5125E−02 | 3.1859E−02 | −2.9536E−02 | 1.1341E−02 | −3.7043E−03 |
| S7 | −1.1104E−01 | 6.7344E−02 | −9.5790E−02 | 1.2969E−01 | −1.2133E−01 |
| S8 | −8.2078E−02 | 3.1259E−02 | −2.5790E−02 | 2.5249E−02 | −1.7216E−02 |
| S9 | −1.5898E−02 | −4.9669E−03 | −3.4240E−03 | 3.2894E−03 | −1.2374E−03 |
| S10 | 4.3050E−02 | −2.2919E−02 | 5.0019E−03 | −5.9588E−04 | 1.8852E−04 |
| S11 | −1.5253E−02 | −1.5956E−03 | 8.5110E−03 | −1.5257E−03 | 1.1588E−04 |
| S12 | −6.8582E−02 | 1.7882E−02 | −4.0525E−03 | 7.2327E−04 | −9.7784E−05 |

| Surface number | A14 | A16 | A18 | A20 |
|---|---|---|---|---|
| S1 | −6.4869E−03 | 2.2060E−03 | −4.0991E−04 | 3.1586E−05 |
| S2 | −5.8702E−03 | 2.1461E−03 | −4.2362E−04 | 3.5426E−05 |
| S3 | −3.3413E−02 | 1.4103E−02 | −3.3307E−03 | 3.3940E−04 |
| S4 | −8.1854E−02 | 4.5446E−02 | −1.4526E−02 | 2.0412E−03 |
| S5 | −1.7837E−01 | 1.0639E−01 | −3.4057E−02 | 4.5319E−03 |
| S6 | 9.7024E−04 | 3.1955E−04 | −2.8116E−04 | 4.7835E−05 |
| S7 | 7.0317E−02 | −2.3722E−02 | 4.2774E−03 | −3.2002E−04 |
| S8 | 7.3954E−03 | −1.9019E−03 | 2.6867E−04 | −1.6046E−05 |

TABLE 11-continued

| | | | | |
|---|---|---|---|---|
| S9  | 3.0617E−04  | −6.8124E−05 | 1.1216E−05 | −7.8322E−07 |
| S10 | −3.7969E−05 | 6.5508E−07  | 4.7688E−07 | −3.3748E−08 |
| S11 | −1.0394E−07 | −6.0884E−07 | 4.0038E−08 | −8.6204E−10 |
| S12 | 9.4565E−06  | −6.0929E−07 | 2.31605−08 | −3.8677E−10 |

Table 12 shows effective focal lengths f1 to f6 of the lenses in embodiment 4, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 12

| | |
|---|---|
| f1 (mm)  | 5.00 |
| f2 (mm)  | −11.61 |
| f3 (mm)  | 93.35 |
| f4 (mm)  | 491.04 |
| f5 (mm)  | 3.75 |
| f6 (mm)  | −2.92 |
| f (mm)   | 5.58 |
| TTL (mm) | 6.70 |
| ImgH (mm)| 4.75 |

Figure 8A:
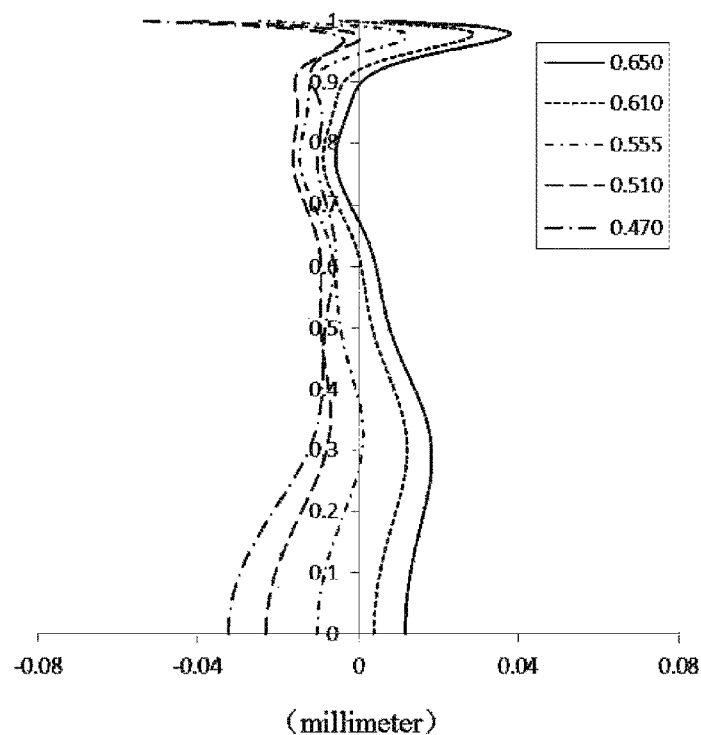
FIG. 8A to FIG. 8D show a longitudinal aberration curve, an astigmatism curve, a distortion curve and a lateral color curve of a photographic optical system according to embodiment 4 respectively.
Figure 8B:
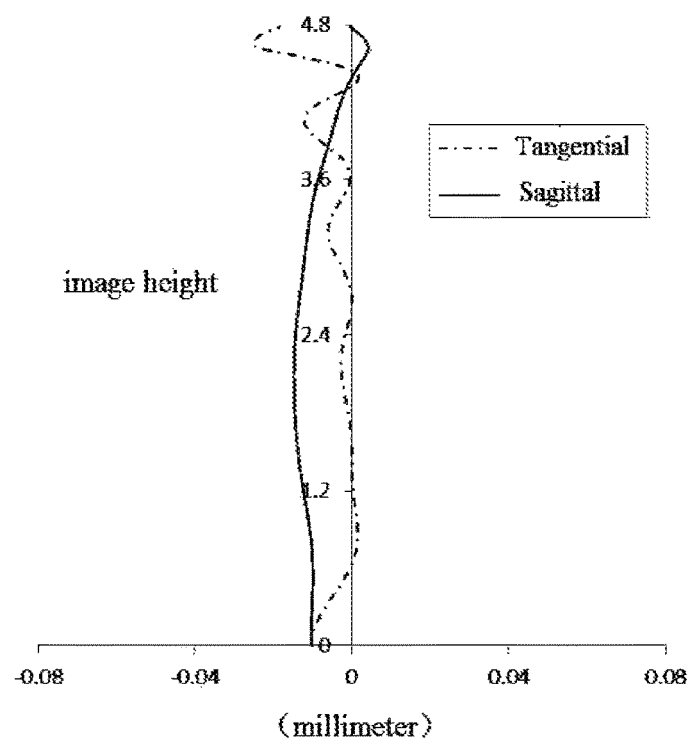
Figure 8C:
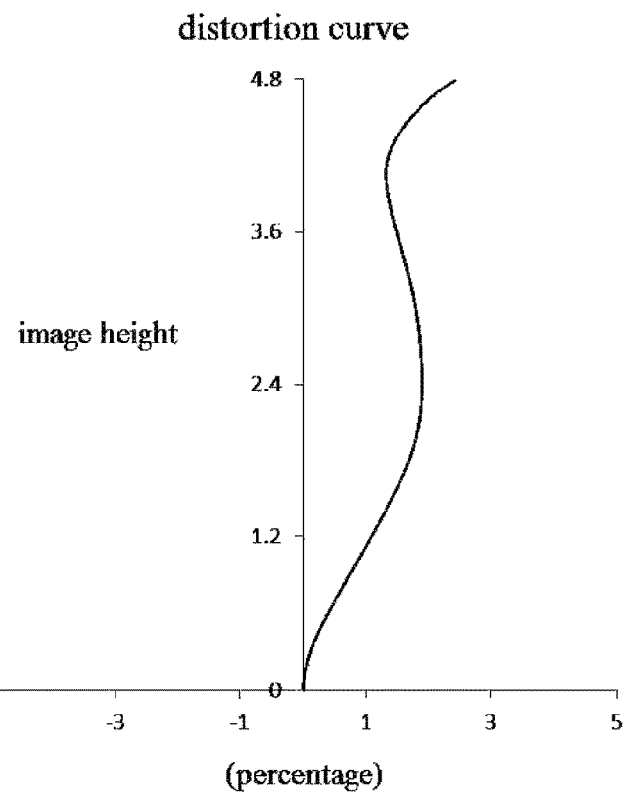
Figure 8D:
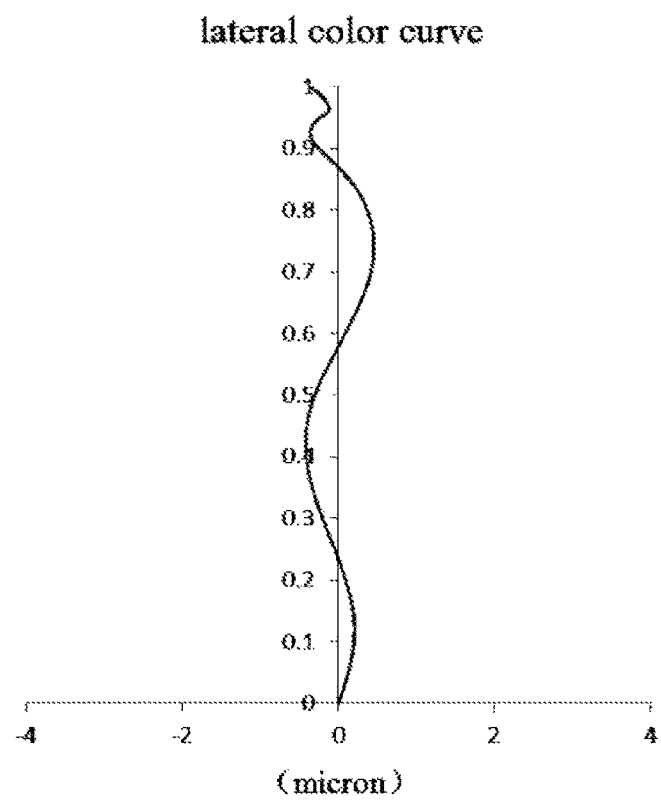

FIG. 8A shows a longitudinal aberration curve of the photographic optical system of embodiment 4, which represents convergence focus deviations of light rays of different wavelengths after passing through the system. FIG. 8B shows an astigmatism curve of the photographic optical system of embodiment 4, which represents a curvature of tangential image surface and a curvature of sagittal image surface. FIG. 8C shows a distortion curve of the photographic optical system of embodiment 4, which represents distortion values corresponding to different image heights. FIG. 8D shows a lateral color curve of the photographic optical system of embodiment 4, which represents deviations of light rays on different image heights of the imaging surface after passing through the system. According to FIG. 8A to FIG. 8D, the photographic optical system provided in embodiment 4 can achieve a good imaging quality.

Embodiment 5

Figure 9:
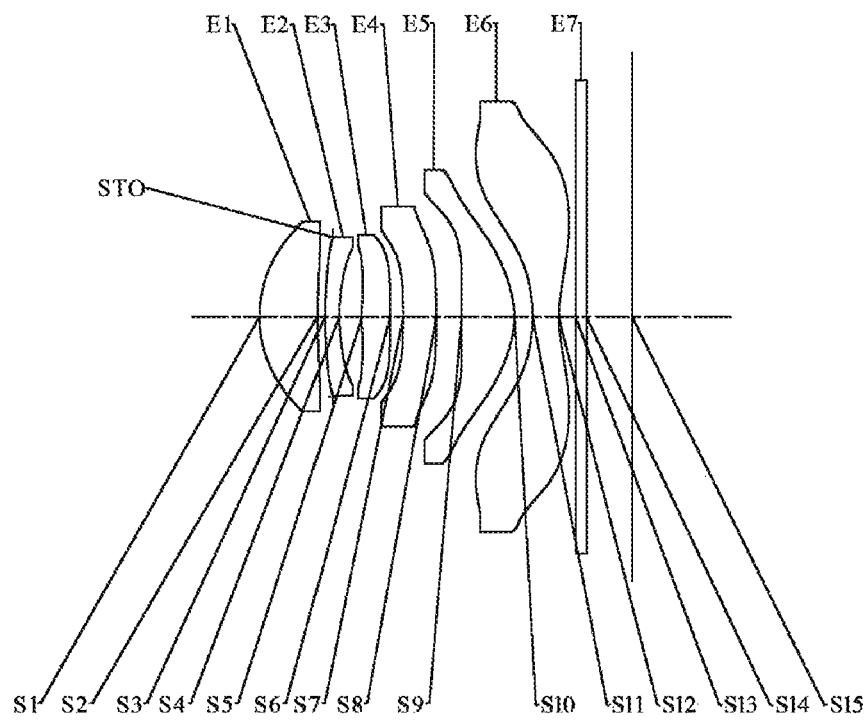
FIG. 9 shows a schematic structural diagram of a photographic optical system according to embodiment 5 of the disclosure.

A photographic optical system according to embodiment 5 of the disclosure will be described below with reference to FIG. 9 to FIG. 10D. FIG. 9 is a schematic structural diagram of a photographic optical system according to embodiment 5 of the disclosure.

As shown in FIG. 9, the photographic optical system according to an exemplary embodiment of the disclosure sequentially includes, from an object side to an image side along an optical axis, a first lens E1, a diaphragm STO, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a negative refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 13 shows the surface type, curvature radius, thickness, material and conic coefficient of each lens of the photographic optical system according to embodiment 5, wherein the units of the curvature radius and the thickness are both millimeter (mm).

TABLE 13

| | | | | Material | | |
|---|---|---|---|---|---|---|
| Surface number | Surface type | Curvature radius | Thickness | Refractive index | Abbe number | Conic coefficient |
| OBJ | Sphere            | Infinite   | Infinite |      |      |          |
| S1  | Aspherical surface| 2.1931     | 1.0377   | 1.55 | 56.1 | −0.0357  |
| S2  | Aspherical surface| 12.0440    | 0.2677   |      |      | −81.7272 |
| STO | Sphere            | Infinite   | −0.1369  |      |      |          |
| S3  | Aspherical surface| 6.2344     | 0.2554   | 1.67 | 20.4 | −14.0419 |
| S4  | Aspherical surface| 3.3381     | 0.4103   |      |      | −1.7278  |
| S5  | Aspherical surface| 17.5093    | 0.5074   | 1.54 | 55.7 | −99.0000 |
| S6  | Aspherical surface| −7811.4875 | 0.2344   |      |      | −99.0000 |
| S7  | Aspherical surface| −17.5746   | 0.5944   | 1.67 | 20.4 | 99.0000  |

TABLE 13-continued

| Surface number | Surface type | Curvature radius | Thickness | Material Refractive index | Abbe number | Conic coefficient |
|---|---|---|---|---|---|---|
| S8 | Aspherical surface | −137.2318 | 0.4560 | | | 99.0000 |
| S9 | Aspherical surface | 25.9951 | 0.9543 | 1.55 | 56.1 | 24.8797 |
| S10 | Aspherical surface | −1.6065 | 0.3271 | | | −4.9587 |
| S11 | Aspherical surface | 2.8850 | 0.4680 | 1.54 | 55.7 | −5.1043 |
| S12 | Aspherical surface | 2.2444 | 0.3032 | | | −12.3418 |
| S13 | Sphere | Infinite | 0.1965 | 1.52 | 64.2 | |
| S14 | Sphere | Infinite | 0.8246 | | | |
| S15 | Sphere | Infinite | | | | |

As can be determined from Table 13, in embodiment 5, the object-side surface and the image-side surface of any one of the first lens E1 to the sixth lens E6 are all aspherical surfaces. Table 14 shows high-order coefficients which can be used for each aspherical lens surfaces in embodiment 5, wherein each aspherical surface can be defined by equation (1) given in embodiment 1 above.

TABLE 14

| Surface number | A4 | A6 | A8 | A10 | A12 |
|---|---|---|---|---|---|
| S1 | −1.1959E−04 | 5.4931E−05 | 4.4085E−03 | −9.5158E−03 | 9.9157E−03 |
| S2 | −2.2630E−02 | 2.5114E−02 | −1.1958E−02 | −3.4232E−03 | 8.5557E−03 |
| S3 | −5.8006E−02 | 5.8008E−02 | 1.8358E−03 | −7.4808E−02 | 1.1189E−01 |
| S4 | −3.7728E−02 | 3.8862E−02 | 3.2027E−02 | −1.2350E−01 | 1.8363E−01 |
| S5 | −3.1258E−02 | 1.2627E−02 | −2.4556E−02 | −8.8826E−03 | 7.6514E−02 |
| S6 | −4.5273E−02 | −6.4765E−03 | 2.8081E−02 | −6.4181E−02 | 6.7663E−02 |
| S7 | −7.0845E−02 | 2.5291E−02 | −3.3997E−02 | 3.6562E−02 | −2.9227E−02 |
| S8 | −6.0880E−02 | 2.1368E−02 | −1.9646E−02 | 1.7170E−02 | −1.0384E−02 |
| S9 | −2.6285E−02 | 2.4847E−03 | −7.1034E−03 | 4.83145E−03 | −2.1365E−03 |
| S10 | −2.6211E−02 | 9.1155E−03 | −7.3340E−03 | 3.3067E−03 | −8.4854E−04 |
| S11 | −3.9298E−02 | 1.3553E−03 | 2.5358E−03 | −4.3166E−04 | 2.0822E−07 |
| S12 | −3.7841E−02 | 1.2407E−02 | −3.1923E−03 | 5.8561E−04 | −7.7781E−05 |

| Surface number | A14 | A16 | A18 | A20 |
|---|---|---|---|---|
| S1 | −5.9980E−03 | 2.1130E−03 | −4.0541E−04 | 3.2225E−05 |
| S2 | −5.7668E−03 | 2.0377E−03 | −3.8097E−04 | 2.9789E−05 |
| S3 | −8.9432E−02 | 4.2096E−02 | −1.0905E−02 | 1.2026E−03 |
| S4 | −1.6306E−01 | 8.9772E−02 | −2.8247E−02 | 3.9266E−03 |
| S5 | −1.1966E−01 | 9.0765E−02 | −3.4961E−02 | 5.4721E−03 |
| S6 | −4.3372E−02 | 1.6907E−02 | −3.5955E−03 | 3.1908E−04 |
| S7 | 1.3354E−02 | −2.5633E−03 | 3.8080E−05 | 2.5063E−05 |
| S8 | 4.0797E−03 | −9.5801E−04 | 1.2211E−04 | −6.5479E−06 |
| S9 | 6.9039E−04 | −1.5483E−04 | 2.0564E−05 | −1.1595E−06 |
| S10 | 1.6018E−04 | −2.2696E−05 | 1.9597E−06 | −7.2365E−08 |
| S11 | 6.7069E−06 | −7.7459E−07 | 3.7575E−08 | −7.0137E−10 |
| S12 | 7.2481E−06 | −4.4712E−07 | 1.6307E−08 | −2.6304E−10 |

Table 15 shows effective focal lengths f1 to f6 of the lenses in embodiment 5, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 15

| f1 (mm) | 4.74 |
|---|---|
| f2 (mm) | −11.17 |
| f3 (mm) | 32.55 |

TABLE 15-continued

| f4 (mm) | −30.28 |
|---|---|
| f5 (mm) | 2.81 |
| f6 (mm) | −2.28 |
| f (mm) | 5.53 |

TABLE 15-continued

| TTL (mm) | 6.70 |
|---|---|
| ImgH (mm) | 4.75 |

Figure 10A:
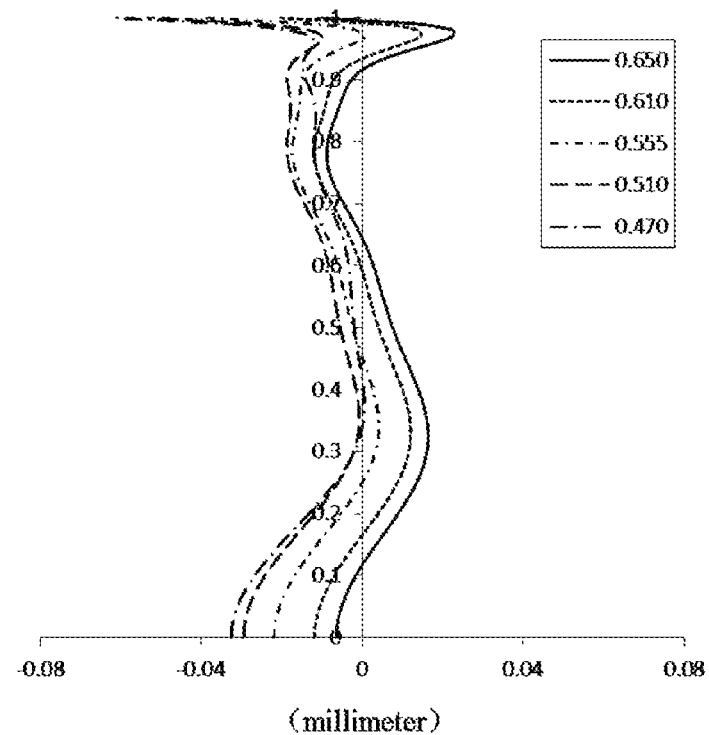
FIG. 10A to FIG. 10D show a longitudinal aberration curve, an astigmatism curve, a distortion curve and a lateral color curve of a photographic optical system according to embodiment 5 respectively.
Figure 10B:
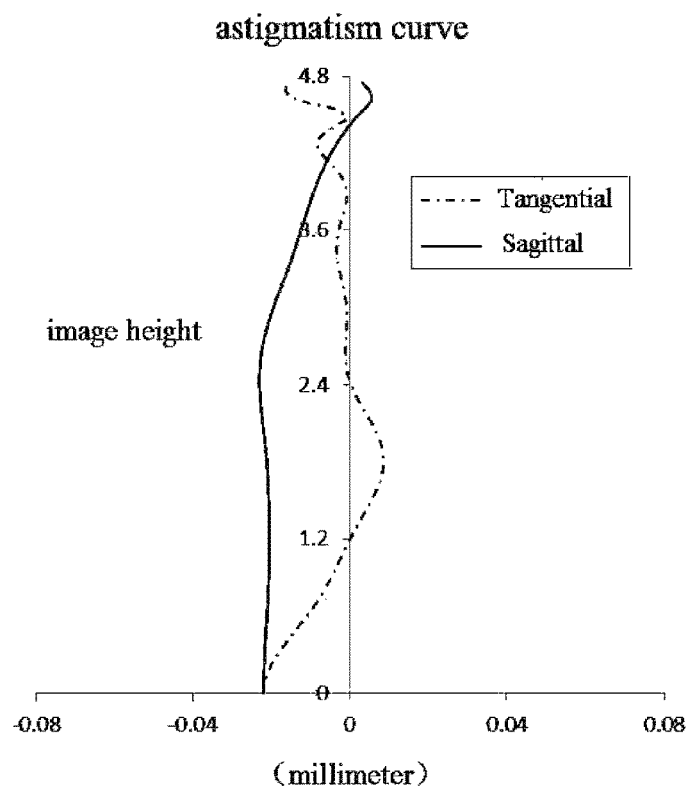
Figure 10C:
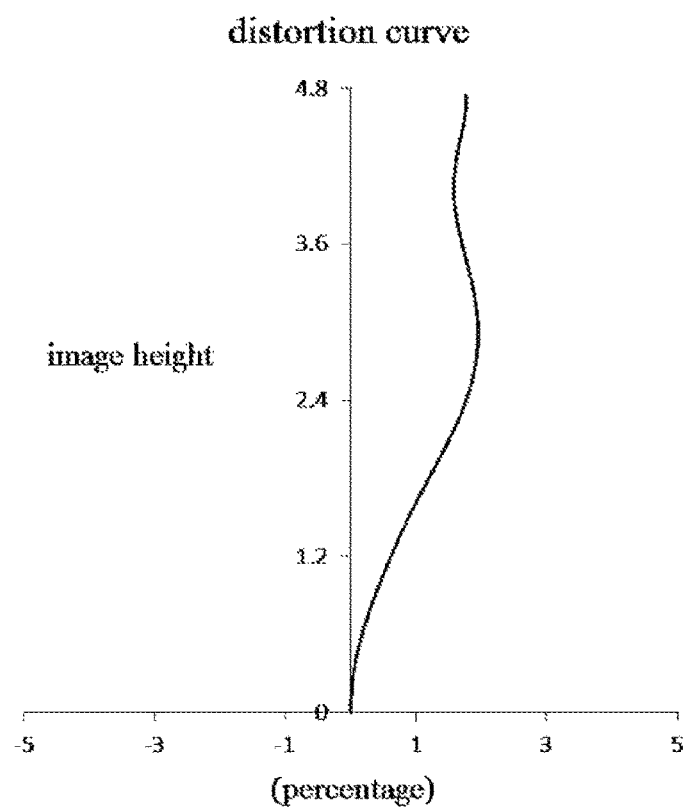
Figure 10D:
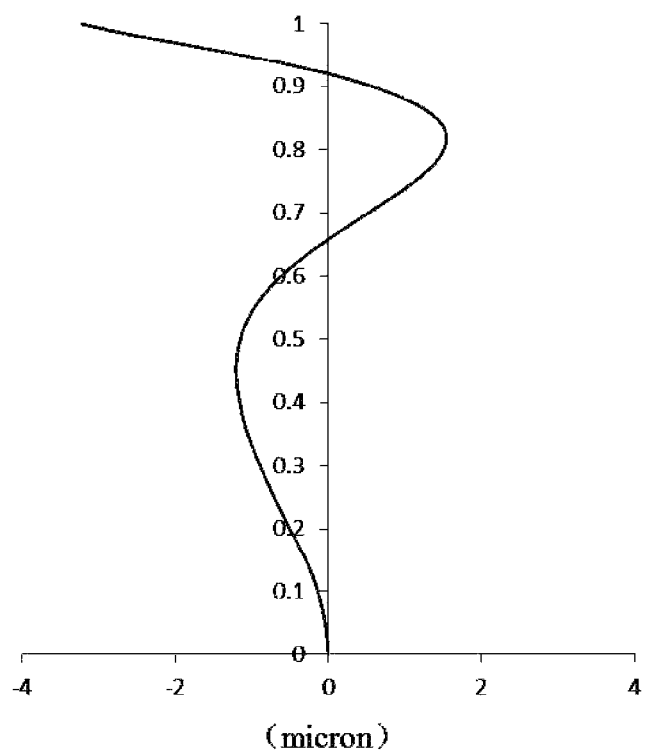

FIG. 10A shows a longitudinal aberration curve of the photographic optical system of embodiment 5, which represents convergence focus deviations of light rays of different wavelengths after passing through the system. FIG. 10B shows an astigmatism curve of the photographic optical system of embodiment 5, which represents a curvature of tangential image surface and a curvature of sagittal image surface. FIG. 10C shows a distortion curve of the photographic optical system of embodiment 5, which represents distortion values corresponding to different image heights. FIG. 10D shows a lateral color curve of the photographic optical system of embodiment 5, which represents deviations of light rays on different image heights of the imaging surface after passing through the system. According to FIG. 10A to FIG. 10D, the photographic optical system provided in embodiment 5 can achieve a good imaging quality.

Embodiment 6

Figure 11:
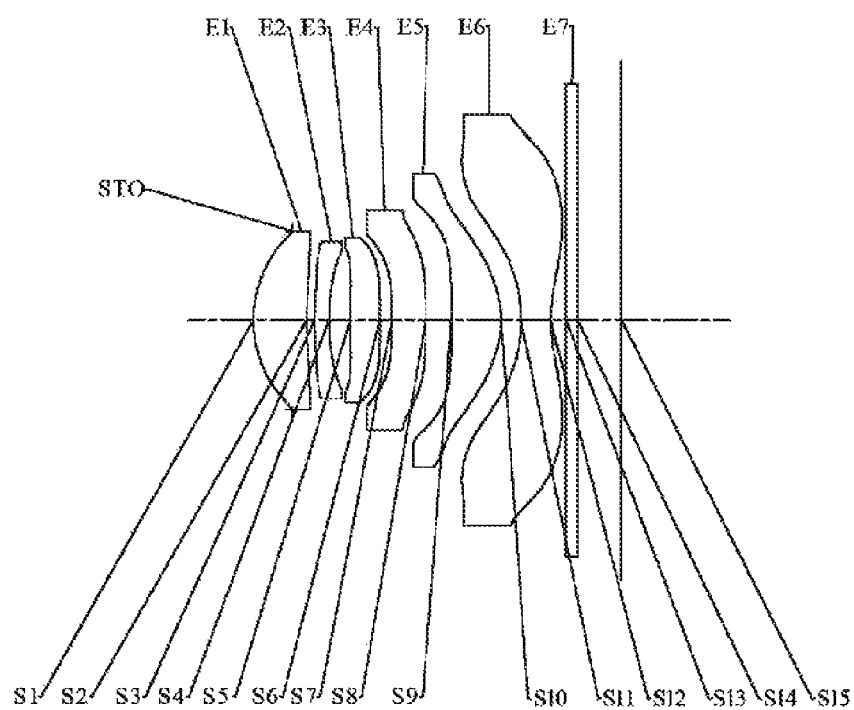
FIG. 11 shows a schematic structural diagram of a photographic optical system according to embodiment 6 of the disclosure.

A photographic optical system according to embodiment 6 of the disclosure will be described below with reference to FIG. 11 to FIG. 12D. FIG. 11 is a schematic structural diagram of a photographic optical system according to embodiment 6 of the disclosure.

As shown in FIG. 11, the photographic optical system according to an exemplary embodiment of the disclosure sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a negative refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 16 shows the surface type, curvature radius, thickness, material and conic coefficient of each lens of the photographic optical system according to embodiment 6, wherein the units of the curvature radius and the thickness are both millimeter (mm).

TABLE 16

| Surface number | Surface type | Curvature radius | Thickness | Material Refractive index | Abbe number | Conic coefficient |
|---|---|---|---|---|---|---|
| OBJ | Sphere | Infinite | Infinite | | | |
| STO | Sphere | Infinite | −0.7101 | | | |
| S1 | Aspherical surface | 2.1817 | 0.9764 | 1.55 | 56.1 | −0.0024 |
| S2 | Aspherical surface | 8.9340 | 0.1417 | | | −72.7529 |
| S3 | Aspherical surface | 6.5935 | 0.2622 | 1.67 | 20.4 | −25.6377 |
| S4 | Aspherical surface | 3.7323 | 0.3904 | | | −2.3898 |
| S5 | Aspherical surface | 17.2329 | 0.5441 | 1.54 | 55.7 | −97.2809 |
| S6 | Aspherical surface | −124.2530 | 0.2136 | | | 99.0000 |
| S7 | Aspherical surface | −16.2726 | 0.6222 | 1.67 | 20.4 | 97.5351 |
| S8 | Aspherical surface | −48.9287 | 0.4672 | | | 99.0000 |
| S9 | Aspherical surface | 108.1168 | 0.9133 | 1.55 | 56.1 | 99.0000 |
| S10 | Aspherical surface | −1.6860 | 0.3581 | | | −5.0425 |
| S11 | Aspherical surface | −3.1414 | 0.5402 | 1.54 | 55.7 | −3.9996 |
| S12 | Aspherical surface | 2.2726 | 0.2861 | | | −12.4188 |
| S13 | Sphere | Infinite | 0.2100 | 1.52 | 64.2 | |
| S14 | Sphere | Infinite | 0.8045 | | | |
| S15 | Sphere | Infinite | | | | |

As can be determined from Table 16, in embodiment 6, the object-side surface and the image-side surface of any one of the first lens E1 to the sixth lens E6 are all aspherical surfaces. Table 17 shows high-order coefficients which can be used for each aspherical lens surfaces in embodiment 6, wherein each aspherical surface can be defined by equation (1) given in embodiment 1 above.

TABLE 17

| Surface number | A4 | A6 | A8 | A10 | A12 |
|---|---|---|---|---|---|
| S1 | −1.4139E−03 | 8.7840E−03 | −1.8290E−02 | 2.4141E−02 | −2.0119E−02 |
| S2 | −1.9943E−02 | 2.0585E−02 | −1.6333E−02 | 1.8226E−02 | −2.0826E−02 |

TABLE 17-continued

| | | | | |
|---|---|---|---|---|
| S3 | −6.0400E−02 | 5.6714E−02 | −2.4693E−02 | 2.0330E−02 | −3.2454E−02 |
| S4 | −4.2915E−02 | 5.6159E−02 | −5.5618E−02 | 1.1429E−01 | −1.7688E−01 |
| S5 | −3.3966E−02 | 1.8224E−02 | −4.8413E−02 | 7.1349E−02 | −7.6087E−02 |
| S6 | −5.8782E−02 | 2.6178E−02 | −6.4670E−02 | 9.2241E−02 | −9.5630E−02 |
| S7 | −7.2733E−02 | 3.1488E−02 | −6.4123E−02 | 9.5371E−02 | −9.8226E−02 |
| S8 | −5.9897E−02 | 3.3743E−02 | −4.3240E−02 | 4.1936E−02 | −2.6579E−02 |
| S9 | −2.9939E−02 | 8.1716E−03 | −1.0727E−02 | 7.6811E−03 | −4.1637E−03 |
| S10 | −3.6162E−02 | 1.5609E−02 | −7.5175E−03 | 2.0716E−03 | −3.8593E−04 |
| S11 | −4.6436E−02 | 1.7751E−02 | −8.2615E−03 | 2.9473E−03 | −6.0149E−04 |
| S12 | −3.1960E−02 | 1:0861E−02 | −3.2261E−03 | 6.9123E−04 | −1.0411E−04 |

| Surface number | A14 | A16 | A18 | A20 |
|---|---|---|---|---|
| S1 | 1.0584E−02 | −3.4257E−03 | 6.2171E−04 | −4.9195E−05 |
| S2 | 1.5608E−02 | −6.9331E−03 | 1.6662E−03 | −1.6741E−04 |
| S3 | 3.2096E−02 | −1.7141E−02 | 4.7605E−03 | −5.4138E−04 |
| S4 | 1.6514E−01 | −8.9432E−02 | 2.6077E−02 | −3.1345E−03 |
| S5 | 5.2971E−02 | −2.2981E−02 | 5.4770E−03 | −5.2917E−04 |
| S6 | 6.4647E−02 | −2.6645E−02 | 6.0816E−03 | −5.9043E−04 |
| S7 | 6.4659E−02 | −2.5463E−02 | 5.4964E−03 | −5.0263E−04 |
| S8 | 1.0873E−02 | −2.7505E−03 | 3.8949E−04 | −2.3436E−05 |
| S9 | 1.6185E−03 | −3.9947E−04 | 5.4108E−05 | −3.0024E−06 |
| S10 | 1.0098E−04 | −2.2459E−05 | 2.4780E−06 | −1.0220E−07 |
| S11 | 7.1757E−05 | −5.0337E−06 | 1.9385E−07 | −3.1795E−09 |
| S12 | 1.0574E−05| | −6.8420E−07 | 2.5284E−08 | −4.0245E−10 |

Table 18 shows effective focal lengths f1 to f6 of the lenses in embodiment 6, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 18

| | |
|---|---|
| f1 (mm) | 5.03 |
| f2 (mm) | −13.39 |
| f3 (mm) | 28.23 |
| f4 (mm) | −36.84 |
| f5 (mm) | 3.05 |
| f6 (mm) | −2.37 |
| f (mm) | 5.54 |
| TTL (mm) | 6.73 |
| ImgH (mm) | 4.75 |

Figure 12A:
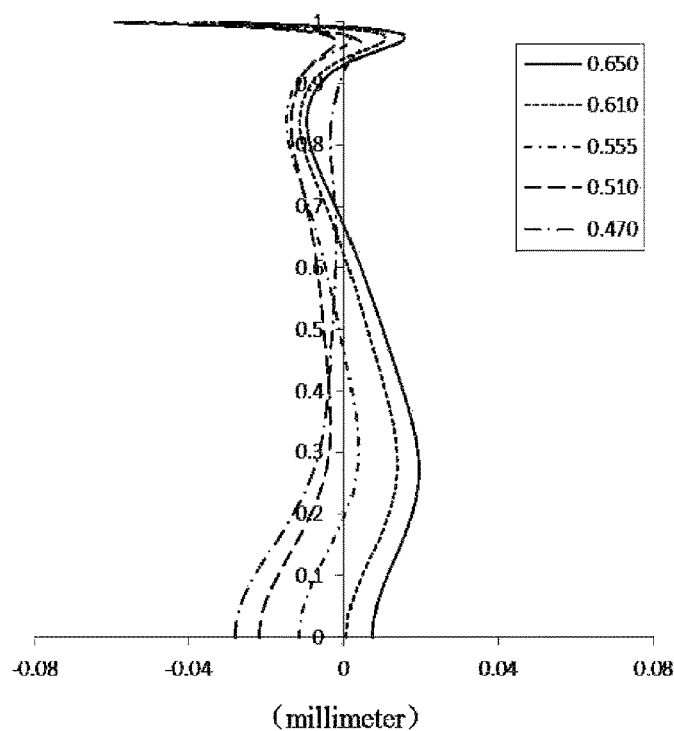
FIG. 12A to FIG. 12D show a longitudinal aberration curve, an astigmatism curve, a distortion curve and a lateral color curve of a photographic optical system according to embodiment 6 respectively.
Figure 12B:
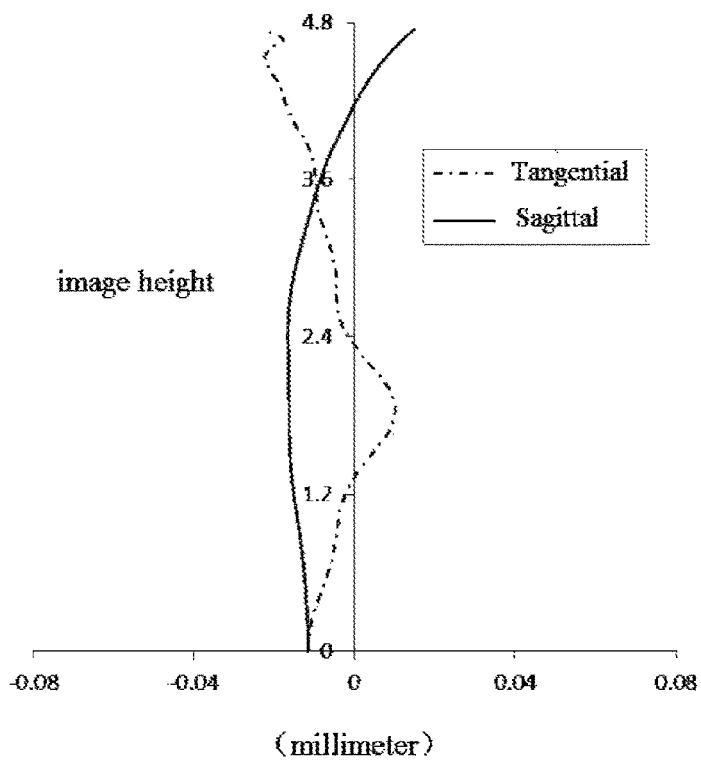
Figure 12C:
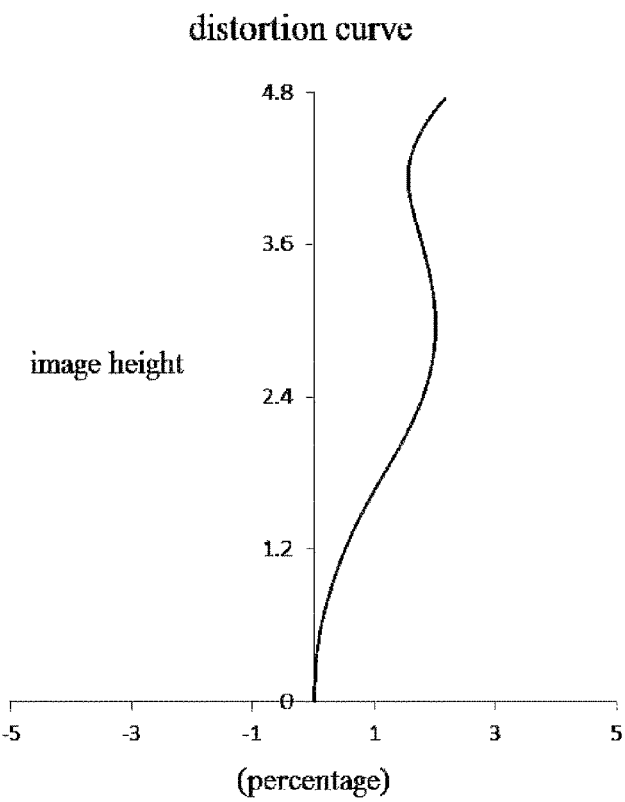
Figure 12D:
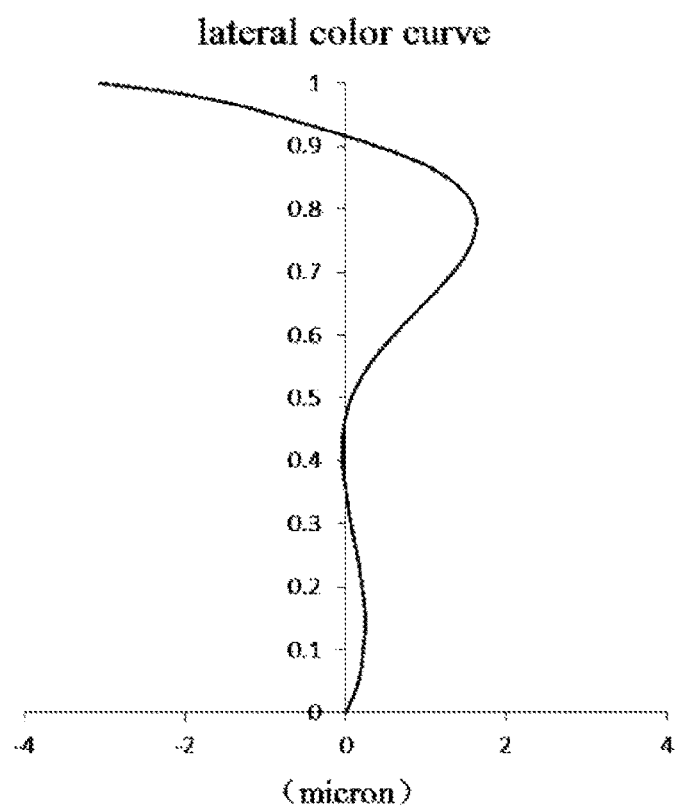

FIG. 12A shows a longitudinal aberration curve of the photographic optical system of embodiment 6, which represents convergence focus deviations of light rays of different wavelengths after passing through the system. FIG. 12B shows an astigmatism curve of the photographic optical system of embodiment 6, which represents a curvature of tangential image surface and a curvature of sagittal image surface. FIG. 12C shows a distortion curve of the photographic optical system of embodiment 6, which represents distortion values corresponding to different image heights. FIG. 12D shows a lateral color curve of the photographic optical system of embodiment 6, which represents deviations of light rays on different image heights of the imaging surface after passing through the system. According to FIG. 12A to FIG. 12D, the photographic optical system provided in embodiment 6 can achieve a good imaging quality.

Embodiment 7

Figure 13:
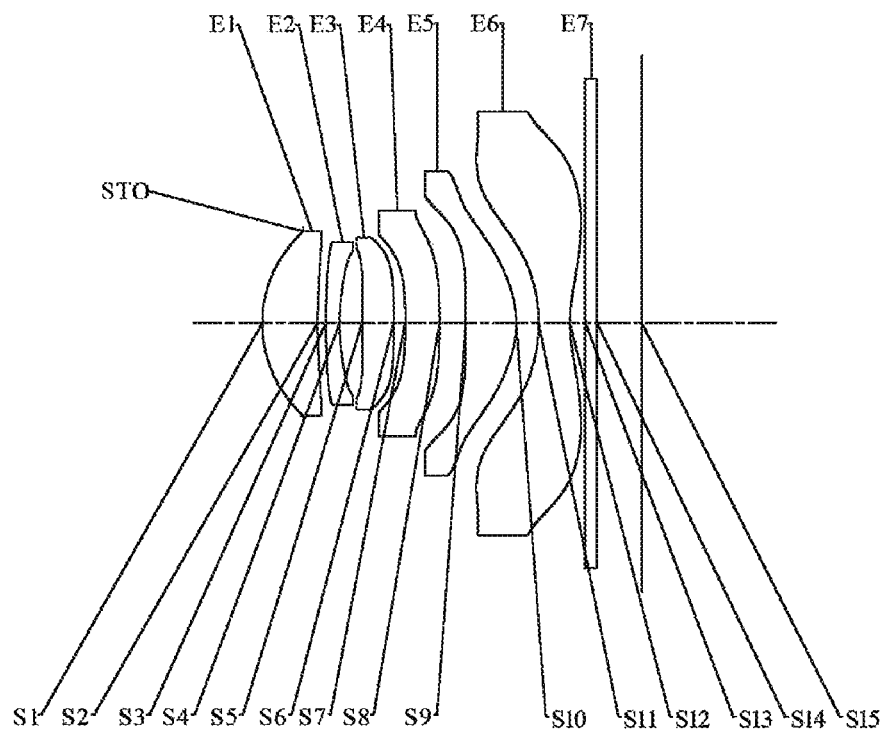
FIG. 13 shows a schematic structural diagram of a photographic optical system according to embodiment 7 of the disclosure.

A photographic optical system according to embodiment 7 of the disclosure will be described below with reference to FIG. 13 to FIG. 14D. FIG. 13 is a schematic structural diagram of a photographic optical system according to embodiment 7 of the disclosure.

As shown in FIG. 13, the photographic optical system according to an exemplary embodiment of the disclosure sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a negative refractive power, an object-side surface S7 thereof is a concave surface, and an image-side surface S8 is a convex surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface 314. Light from an object sequentially penetrates through each of the surfaces S1 to S14 and is finally imaged on the imaging surface 315.

Table 19 shows the surface type, curvature radius, thickness, material and conic coefficient of each lens of the photographic optical system according to embodiment 7, wherein the units of the curvature radius and the thickness are both millimeter (mm).

TABLE 19

| Surface number | Surface type | Curvature radius | Thickness | Material Refractive index | Abbe number | Conic coefficient |
|---|---|---|---|---|---|---|
| OBJ | Sphere | Infinite | Infinite | | | |
| STO | Sphere | Infinite | −0.7110 | | | |
| S1 | Aspherical surface | 2.1851 | 0.9771 | 1.55 | 56.1 | 0.0027 |
| S2 | Aspherical surface | 8.7953 | 0.1428 | | | −73.0510 |
| S3 | Aspherical surface | 7.1197 | 0.2456 | 1.67 | 20.4 | −29.6990 |
| S4 | Aspherical surface | 3.9573 | 0.3956 | | | −2.6251 |
| S5 | Aspherical surface | 18.0808 | 0.5604 | 1.54 | 55.7 | −99.0000 |
| S6 | Aspherical surface | −88.8219 | 0.2018 | | | 99.0000 |
| S7 | Aspherical surface | −17.0729 | 0.6028 | 1.67 | 20.4 | 99.0000 |
| S8 | Aspherical surface | −48.1719 | 0.4634 | | | 99.0000 |
| S9 | Aspherical surface | 256.4264 | 0.8946 | 1.55 | 56.1 | 99.0000 |
| S10 | Aspherical surface | −1.7337 | 0.3933 | | | −5.0926 |
| S11 | Aspherical surface | −3.1363 | 0.5475 | 1.54 | 55.7 | −3.6149 |
| S12 | Aspherical surface | 2.3584 | 0.2740 | | | −13.0482 |
| S13 | Sphere | Infinite | 0.2100 | 1.52 | 64.2 | |
| S14 | Sphere | Infinite | 0.7912 | | | |
| S15 | Sphere | Infinite | | | | |

As can be determined from Table 19, in embodiment 7, the object-side surface and the image-side surface of any one of the first lens E1 to the sixth lens E6 are all aspherical surfaces. Table 20 shows high-order coefficients which can be used for each aspherical lens surfaces in embodiment 7, wherein each aspherical surface can be defined by equation (1) given in embodiment 1 above.

Table 21 shows effective focal lengths f1 to f6 of the lenses in embodiment 7, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 20

| Surface number | A4 | A6 | A8 | A10 | A12 |
|---|---|---|---|---|---|
| S1 | −1.4304E−03 | 8.6937E−03 | −1.7385E−02 | 2.2318E−02 | −1.8171E−02 |
| S2 | −1.9305E−02 | 1.8495E−02 | −1.2501E−02 | 1.3562E−02 | −1.7028E−02 |
| S3 | −6.4995E−02 | 6.1193E−02 | −2.4692E−02 | 1.8002E−02 | −3.1170E−02 |
| S4 | −4.6805E−02 | 6.0452E−02 | −5.5829E−02 | 1.1431E−01 | −1.8116E−01 |
| S5 | −3.5567E−02 | 1.9088E−02 | −4.6905E−02 | 6.4179E−02 | −6.2094E−02 |
| S6 | −6.0548E−02 | 2.2490E−02 | −5.5819E−02 | 8.1464E−02 | −8.7056E−02 |
| S7 | −7.3371E−02 | 2.1583E−02 | −3.8994E−02 | 5.5579E−02 | −5.7388E−02 |
| S8 | −5.8456E−02 | 2.9089E−02 | −3.7065E−02 | 3.6498E−02 | −2.3374E−02 |
| S9 | −2.5423E−02 | 7.7336E−05 | 6.6994E−04 | −2.1733E−03 | 1.0800E−03 |
| S10 | −3.6454E−02 | 1.3530E−02 | −3.4348E−03 | −1.0883E−03 | 9.2497E−04 |
| S11 | −5.1822E−02 | 2.4423E−02 | −1.2209E−02 | 4.2176E−03 | −8.4210E−04 |
| S12 | −3.2057E−02 | 1.1499E−02 | −3.5690E−03 | 7.8497E−04 | −1.1952E−04 |

| Surface number | A14 | A16 | A18 | A20 |
|---|---|---|---|---|
| S1 | 9.3766E−03 | −2.9888E−03 | 5.3601E−04 | −4.2198E−05 |
| S2 | 1.3575E−02 | −6.2576E−03 | 1.5410E−03 | −1.5763E−04 |
| S3 | 3.2239E−02 | −1.7531E−02 | 4.9060E−03 | −5.5950E−04 |
| S4 | 1.7141E−01 | −9.3332E−02 | 2.7227E−02 | −3.2650E−03 |
| S5 | 3.8300E−02 | −1.4397E−02 | 2.8259E−03 | −1.9255E−04 |
| S6 | 6.0591E−02 | −2.5833E−02 | 6.1451E−03 | −6.2619E−04 |
| S7 | 3.8509E−02 | −1.5642E−02 | 3.5511E−03 | −3.4823E−04 |
| S8 | 9.6348E−03 | −2.4647E−03 | 3.5555E−04 | −2.1927E−05 |
| S9 | −9.5867E−05 | −6.6958E−05 | 1.9214E−05 | −1.4822E−06 |
| S10 | −2.0948E−04 | 1.9551E−05 | −5.4985E−07 | −1.1891E−08 |
| S11 | 9.9621E−05 | −6.9863E−06 | 2.7029E−07 | −4.4678E−09 |
| S12 | 1.2161E−05 | −7.8491E−07 | 2.8887E−08 | −4.5800E−10 |

TABLE 21

| | |
|---|---|
| f1 (mm) | 5.06 |
| f2 (mm) | −13.79 |
| f3 (mm) | 28.04 |
| f4 (mm) | −39.96 |
| f5 (mm) | 3.16 |
| f6 (mm) | −2.42 |
| f (mm) | 5.50 |
| TTL (mm) | 6.70 |
| ImgH (mm) | 4.75 |

Figure 14A:
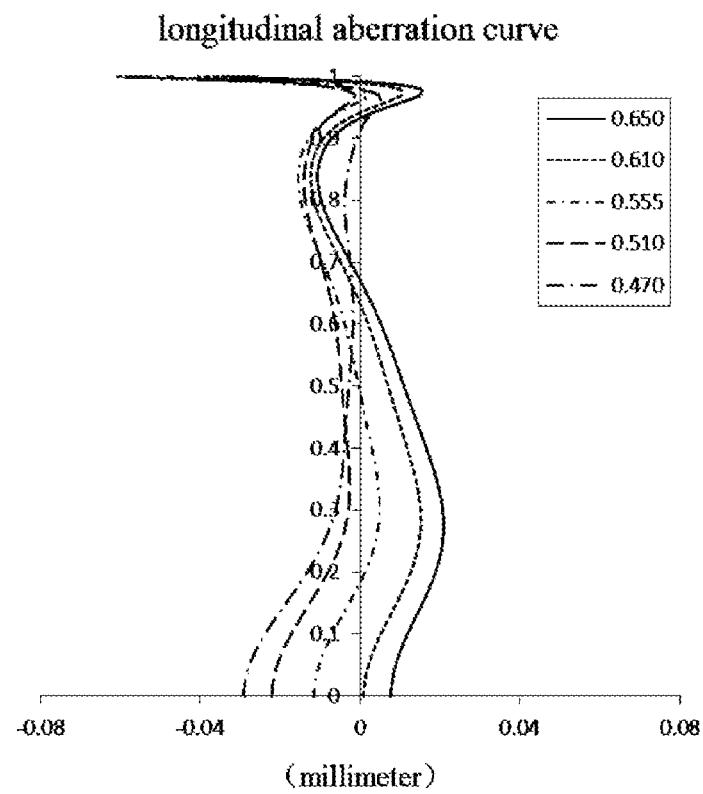
FIG. 14A to FIG. 14D show a longitudinal aberration curve, an astigmatism curve, a distortion curve and a lateral color curve of a photographic optical system according to embodiment 7 respectively.
Figure 14B:
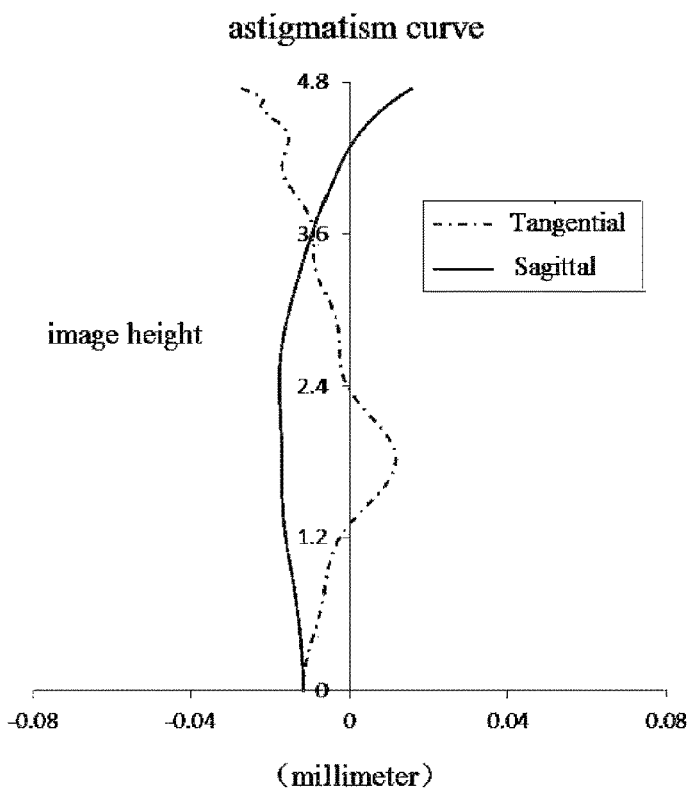
Figure 14C:
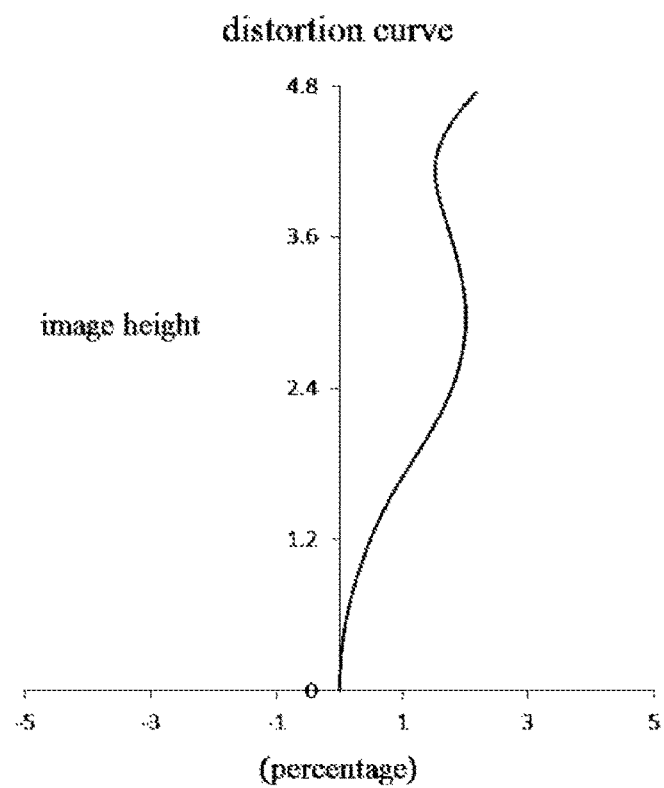
Figure 14D:
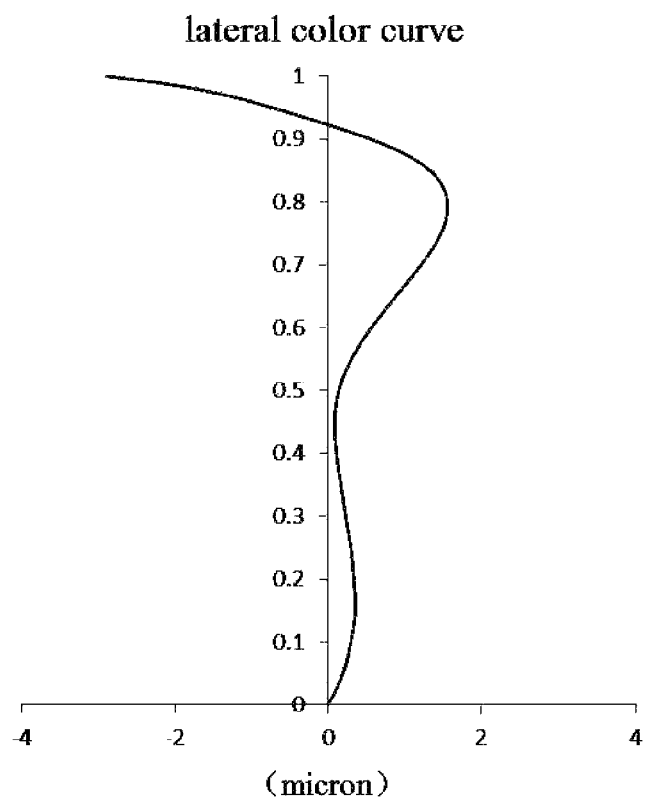

FIG. 14A shows a longitudinal aberration curve of the photographic optical system of embodiment 7, which represents convergence focus deviations of light rays of different wavelengths after passing through the system. FIG. 14B shows an astigmatism curve of the photographic optical system of embodiment 7, which represents a curvature of tangential image surface and a curvature of sagittal image surface. FIG. 14C shows a distortion curve of the photographic optical system of embodiment 7, which represents distortion values corresponding to different image heights. FIG. 14D shows a lateral color curve of the photographic optical system of embodiment 7, which represents deviations of light rays on different image heights of the imaging surface after passing through the system. According to FIG. 14A to FIG. 14D, the photographic optical system provided in embodiment 7 can achieve a good imaging quality.

Embodiment 8

Figure 15:
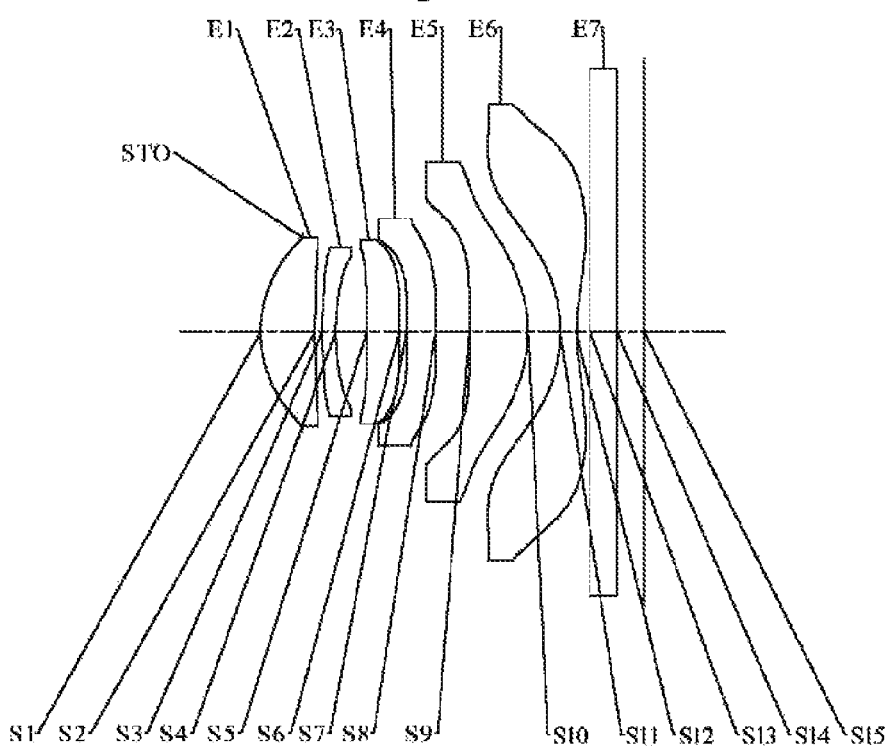
FIG. 15 shows a schematic structural diagram of a photographic optical system according to embodiment 8 of the disclosure.

A photographic optical system according to embodiment 8 of the disclosure will be described below with reference to FIG. 15 to FIG. 16D. FIG. 15 is a schematic structural diagram of a photographic optical system according to embodiment 8 of the disclosure.

As shown in FIG. 15, the photographic optical system according to an exemplary embodiment of the disclosure sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a convex surface, and an image-side surface S6 is a concave surface. The fourth lens E4 has a positive refractive power, an object-side surface S7 thereof is a convex surface, and an image-side surface S8 is a concave surface. The fifth lens E5 has a positive refractive power, an object-side surface S9 thereof is a convex surface, and an image-side surface S10 is a convex surface. The sixth lens E6 has a negative refractive power, an object-side surface S11 thereof is a concave surface, and an image-side surface S12 is a concave surface. The optical filter E7 has an object-side surface S13 and an image-side surface 314. Light from an object sequentially penetrates through each of the surfaces S1 to S14 and is finally imaged on the imaging surface S15.

Table 22 shows the surface type, curvature radius, thickness, material and conic coefficient of each lens of the photographic optical system according to embodiment 8, wherein the units of the curvature radius and the thickness are both millimeter (mm).

TABLE 22

| Surface number | Surface type | Curvature radius | Thickness | Material Refractive index | Abbe number | Conic coefficient |
|---|---|---|---|---|---|---|
| OBJ | Sphere | Infinite | Infinite | | | |
| STO | Sphere | Infinite | −0.7302 | | | |
| S1 | Aspherical surface | 2.1938 | 0.9465 | 1.55 | 56.1 | 0.0173 |
| S2 | Aspherical surface | 10.9421 | 0.1298 | | | −68.6098 |
| S3 | Aspherical surface | 6.9387 | 0.2347 | 1.67 | 20.4 | −17.7939 |
| S4 | Aspherical surface | 3.8753 | 0.5428 | | | −1.1315 |
| S5 | Aspherical surface | 65.3715 | 0.5696 | 1.54 | 55.7 | 63.7804 |
| S6 | Aspherical surface | 25.6516 | 0.1272 | | | −3.7058 |
| S7 | Aspherical surface | 14.8986 | 0.5050 | 1.67 | 20.4 | −99.0000 |
| S8 | Aspherical surface | 32.4416 | 0.5896 | | | −23.9932 |
| S9 | Aspherical surface | 65.3106 | 1.0309 | 1.55 | 56.1 | 99.0000 |
| S10 | Aspherical surface | −2.1766 | 0.5573 | | | −5.7429 |
| S11 | Aspherical surface | −2.9898 | 0.2820 | 1.54 | 55.7 | −3.0680 |
| S12 | Aspherical surface | 2.8601 | 0.2383 | | | −17.1020 |
| S13 | Sphere | Infinite | 0.4707 | 1.52 | 64.2 | |
| S14 | Sphere | Infinite | 0.4755 | | | |
| S15 | Sphere | Infinite | | | | |

As can be determined from Table 22, in embodiment 8, the object-side surface and the image-side surface of any one of the first lens E1 to the sixth lens E6 are all aspherical surfaces. Table 23 shows high-order coefficients which can be used for each aspherical lens surfaces in embodiment 8, wherein each aspherical surface can be defined by equation (1) given in embodiment 1 above.

TABLE 23

| Surface number | A4 | A6 | A8 | A10 | A12 |
|---|---|---|---|---|---|
| S1 | 4.7743E−04 | 2.3864E−03 | −3.4031E−03 | 3.3098E−03 | −1.9609E−03 |
| S2 | −1.9753E−02 | 2.1802E−02 | −1.7495E−02 | 1.4738E−02 | −1.2321E−02 |
| S3 | −5.3755E−02 | 5.0974E−02 | −2.1512E−02 | 8.0293E−03 | −7.8392E−03 |
| S4 | −3.5519E−02 | 4.7268E−02 | −3.7671E−02 | 6.0648E−02 | −8.3671E−02 |
| S5 | −2.5235E−02 | 4.0995E−03 | −1.1843E−03 | −1.1831E−02 | 2.1359E−02 |
| S6 | −8.7117E−02 | 6.1185E−02 | −8.3678E−02 | 9.0415E−02 | −7.3315E−02 |
| S7 | −1.0300E−01 | 6.7252E−02 | −1.1947E−01 | 1.7267E−01 | −1.7206E−01 |
| S8 | −5.9950E−02 | 2.8359E−02 | −3.7625E−02 | 3.9499E−02 | −2.6620E−02 |
| S9 | −2.1949E−02 | 1.9926E−03 | −5.6128E−03 | 4.6594E−03 | −2.5959E−03 |
| S10 | −1.6699E−02 | −5.5300E−04 | 1.1342E−03 | −1.0255E−03 | 4.6622E−04 |
| S11 | −4.1572E−02 | 1.2360E−02 | −4.4245E−03 | 1.4142E−03 | −2.6222E−04 |
| S12 | −2.6863E−02 | 8.2350E−03 | −2.1921E−03 | 4.3476E−04 | −6.2544E−05 |

| Surface number | A14 | A16 | A18 | A20 |
|---|---|---|---|---|
| S1 | 6.9680E−04 | −1.6323E−04 | 2.6585E−05 | −3.3161E−06 |
| S2 | 7.4936E−03 | −2.8634E−03 | 6.0723E−04 | −5.4691E−05 |
| S3 | 8.0507E−03 | −4.3557E−03 | 1.1797E−03 | −1.2701E−04 |
| S4 | 7.3585E−02 | −3.7685E−02 | 1.0355E−02 | −1.1526E−03 |
| S5 | −1.8391E−02 | 8.8409E−03 | −2.2723E−03 | 2.4695E−04 |
| S6 | 4.2295E−02 | −1.6419E−02 | 3.7947E−03 | −3.9101E−04 |
| S7 | 1.1155E−01 | −4.5002E−02 | 1.0195E−02 | −9.8828E−04 |
| S8 | 1.1260E−02 | −2.9207E−03 | 4.2484E−04 | −2.6291E−05 |
| S9 | 9.8518E−04 | −2.3712E−04 | 3.1322E−05 | −1.6839E−06 |
| S10 | −9.8038E−05 | 1.0423E−05 | −5.4592E−07 | 1.1071E−08 |
| S11 | 2.8151E−05 | −1.7626E−06 | 6.0225E−08 | −8.7260E−10 |
| S12 | 6.1421E−06 | −3.8615E−07 | 1.3888E−08 | −2.1506E−10 |

Table 24 shows effective focal lengths f1 to f6 of the lenses in embodiment 8, a total effective focal length f of the photographic optical system, TTL and ImgH. TTL is a distance from the object-side surface S1 of the first lens E1 to the imaging surface S15 on the optical axis, ImgH is a half the diagonal length of an effective pixel area on the imaging surface S15.

TABLE 24

| | |
|---|---|
| f1 (mm) | 4.84 |
| f2 (mm) | −13.58 |
| f3 (mm) | −79.05 |
| f4 (mm) | 40.84 |
| f5 (mm) | 3.88 |
| f6 (mm) | −2.68 |
| f (mm) | 5.54 |
| TTL (mm) | 6.70 |
| ImgH (mm) | 4.75 |

Figure 16A:
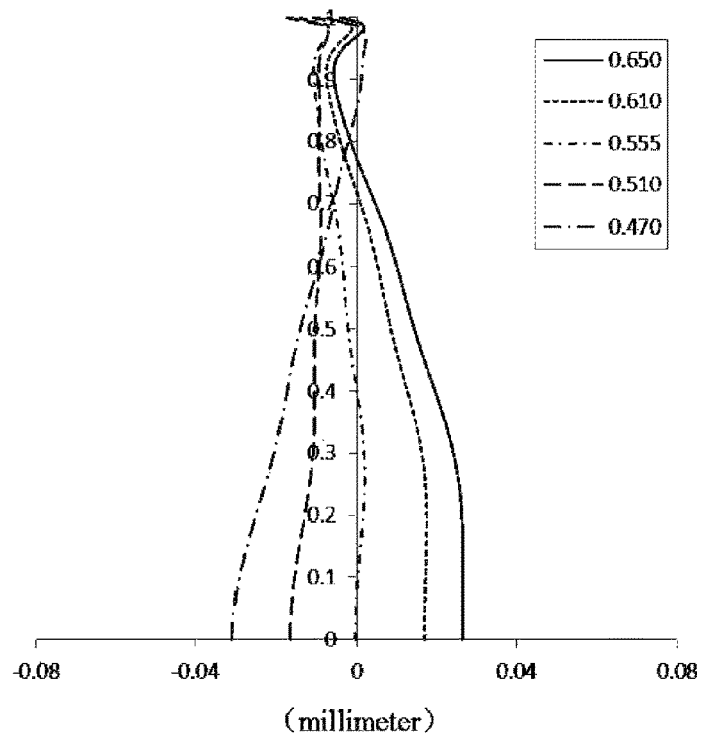
FIG. 16A to FIG. 16D show a longitudinal aberration curve, an astigmatism curve, a distortion curve and a lateral color curve of a photographic optical system according to embodiment 8 respectively.
Figure 16B:
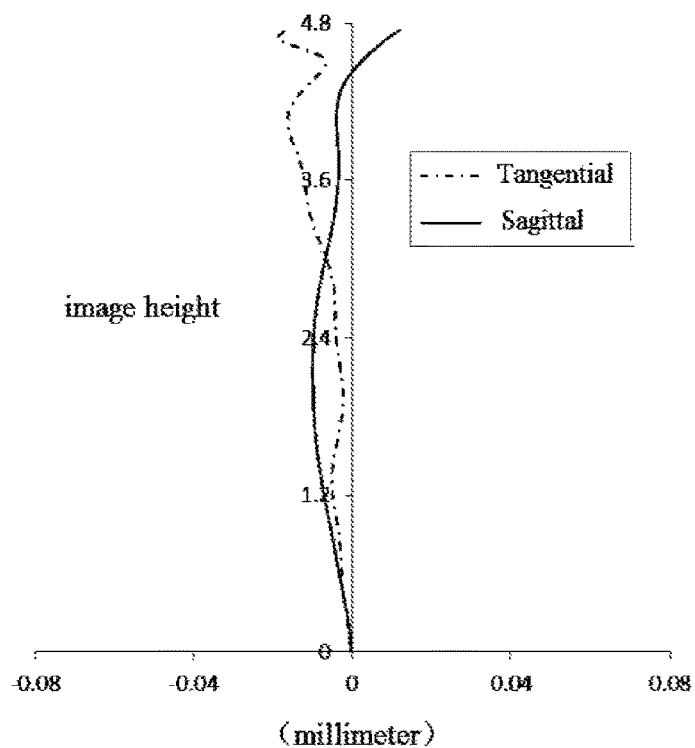
Figure 16C:
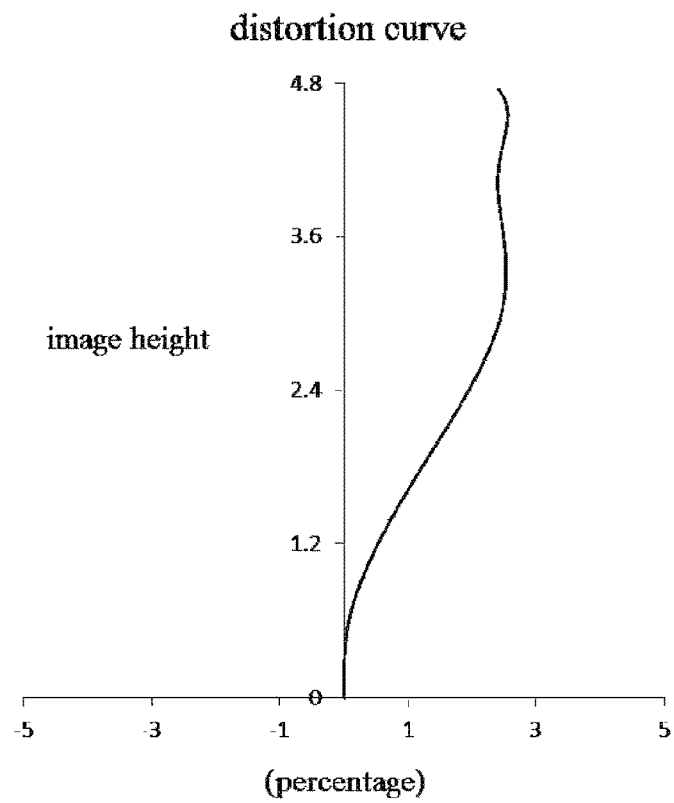
Figure 16D:
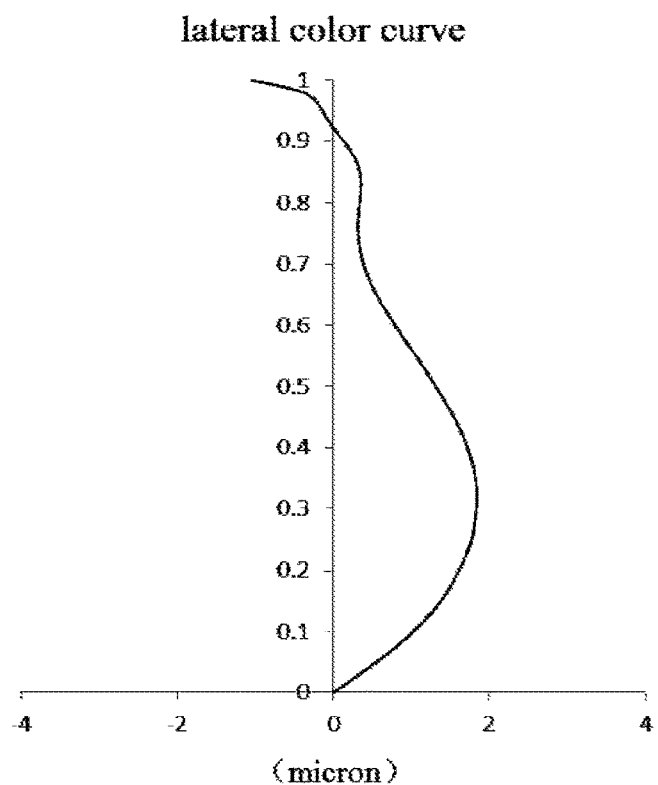

FIG. 16A shows a longitudinal aberration curve of the photographic optical system according to embodiment 8 to represent deviations of a convergence focal point after light of different wavelengths passes through the system. FIG. 16B shows an astigmatism curve of the photographic optical system according to embodiment 8 to represent a meridian image surface curvature and a sagittal image surface curvature. FIG. 16C shows a distortion curve of the photographic optical system according to embodiment 8 to represent distortion values corresponding to different image heights. FIG. 16D shows a lateral color curve of the photographic optical system according to embodiment 8 to represent deviations of different image heights on the imaging surface after the light passes through the system. According to FIG. 16A to FIG. 16D, it can be seen that high imaging quality of the photographic optical system provided in embodiment 8 may be achieved. FIG. 16A shows a longitudinal aberration curve of the photographic optical system of embodiment 8, which represents convergence focus deviations of light rays of different wavelengths after passing through the system. FIG. 16B shows an astigmatism curve of the photographic optical system of embodiment 8, which represents a curvature of tangential image surface and a curvature of sagittal image surface. FIG. 16C shows a distortion curve of the photographic optical system of embodiment 8, which represents distortion values corresponding to different image heights. FIG. 16D shows a lateral color curve of the photographic optical system of embodiment 8, which represents deviations of light rays on different image heights of the imaging surface after passing through the system. According to FIG. 16A to FIG. 16D, the photographic optical system provided in embodiment 8 can achieve a good imaging quality.

In summary embodiment 1 to embodiment 8 satisfy the relationships shown in Table 25 respectively.

TABLE 25

| Conditional expression\Embodiment | 1 | 2 | 3 | 4 | 5 | 6 | 7 | 8 |
|---|---|---|---|---|---|---|---|---|
| f*TAN(HFOV) (mm) | 4.64 | 4.71 | 4.67 | 4.66 | 4.64 | 4.64 | 4.64 | 4.64 |
| TTL/ImgH | 1.41 | 1.40 | 1.40 | 1.41 | 1.41 | 1.42 | 1.41 | 1.41 |
| f1/f6 | −2.09 | −1.92 | −1.72 | −1.71 | −2.08 | −2.12 | −2.09 | −1.81 |
| f2/(f5*2) | −2.18 | −1.85 | −1.58 | −1.55 | −1.99 | −2.19 | −2.18 | −1.75 |
| |SAG52/CT5| | 1.35 | 1.17 | 1.28 | 1.27 | 1.35 | 1.36 | 1.35 | 1.17 |
| ET6/CT6 | 1.60 | 1.12 | 1.39 | 1.37 | 1.24 | 1.57 | 1.60 | 1.46 |
| R4/R1 | 1.81 | 1.46 | 1.47 | 1.62 | 1.52 | 1.71 | 1.81 | 1.77 |
| R3/R11 | −2.27 | −2.26 | −1.44 | −1.94 | −2.16 | −2.10 | −2.27 | −2.32 |

TABLE 25-continued

| Conditional expression\Embodiment | 1 | 2 | 3 | 4 | 5 | 6 | 7 | 8 |
|---|---|---|---|---|---|---|---|---|
| T56/T23 | 0.99 | 0.77 | 1.14 | 1.11 | 0.80 | 0.92 | 0.99 | 1.03 |
| CT1/(CT2 + CT3) | 1.21 | 1.30 | 1.22 | 1.18 | 1.36 | 1.21 | 1.21 | 1.18 |
| f/EPD | 1.69 | 1.70 | 1.69 | 1.69 | 1.70 | 1.70 | 1.69 | 1.69 |

The disclosure also provides an imaging device, wherein the electronic photosensitive element can be a Charge Coupled Device (CCD) or a Complementary Metal Oxide Semiconductor (CMOS). The imaging device may be a stand-alone imaging device, such as a digital camera, or an imaging module integrated on a mobile electronic equipment, such as a cell phone. The imaging device is equipped with the photographic optical system described above.

The above description is only description about the preferred embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. A photographic optical system, sequentially comprising from an object side to an image side along an optical axis: a first lens, a second lens, a third lens, a fourth lens, a fifth lens and a sixth lens,
wherein,
the first lens has a positive refractive power, an object-side surface thereof is a convex surface, and an image-side surface is a concave surface;
the second lens has a negative refractive power, an object-side surface thereof is a convex surface, and an image-side surface is a concave surface;
the third lens has a refractive power;
the fourth lens has a refractive power;
the fifth lens has a positive refractive power;
the sixth lens has a negative refractive power, and an object-side surface thereof is a concave surface; and
TTL is a distance from the object-side surface of the first lens to an imaging surface of the photographic optical system on the optical axis and ImgH is a half the diagonal length of an effective pixel area on the imaging surface of the photographic optical system, and TTL and ImgH satisfy TTL/ImgH<1.5;
a spacing distance T56 of the fifth lens and the sixth lens on the optical axis and a spacing distance T23 of the second lens and the third lens on the optical axis satisfy 0.6<T56/T23<1.2.

2. The photographic optical system as claimed in claim 1, wherein a total effective focal length f of the photographic optical system and a maximum half-field of view (HFOV) of the photographic optical system satisfy 4.6 mm<f*tan(HFOV)<7 mm.

3. The photographic optical system as claimed in claim 1, wherein an effective focal length f1 of the first lens and an effective focal length f6 of the sixth lens satisfy −2.5<f1/f6<−1.5.

4. The photographic optical system as claimed in claim 1, wherein an effective focal length f2 of the second lens and an effective focal length f5 of the fifth lens satisfy −2.5<f2/(f5*2)<−1.5.

5. The photographic optical system as claimed in claim 1, wherein a curvature radius R1 of the object-side surface of the first lens and a curvature radius R4 of the image-side surface of the second lens satisfy 1<R4/R1<2.

6. The photographic optical system as claimed in claim 1, wherein a curvature radius R3 of the object-side surface of the second lens and a curvature radius R11 of the object-side surface of the sixth lens satisfy −2.5<R3/R11<−1.

7. The photographic optical system as claimed in claim 1, wherein a center thickness CT1 of the first lens on the optical axis, a center thickness CT2 of the second lens on the optical axis and a center thickness CT3 of the third lens on the optical axis satisfy 1<CT1/(CT2+CT3)<1.5.

8. The photographic optical system as claimed in claim 1, wherein SAG52 is an on-axis distance from an intersection point of an image-side surface of the fifth lens and the optical axis to a vertex of an effective semi-diameter of the image-side surface of the fifth lens, and SAG52 and a center thickness CT5 of the fifth lens on the optical axis satisfy 1<|SAG52/CT5|<1.5.

9. The photographic optical system as claimed in claim 1, wherein an edge thickness ET6 of the sixth lens and a center thickness CT6 of the sixth lens on the optical axis satisfy 1<ET6/CT6<2.

10. The photographic optical system as claimed in claim 1, wherein a total effective focal length f of the photographic optical system and an entrance pupil diameter (EPD) of the photographic optical system satisfy f/EPD<1.8.

11. A photographic optical system, sequentially comprising from an object side to an image side along an optical axis: a first lens, a second lens, a third lens, a fourth lens, a fifth lens and a sixth lens,
wherein,
the first lens has a positive refractive power, an object-side surface thereof is a convex surface, and an image-side surface is a concave surface;
the second lens has a negative refractive power, an object-side surface thereof is a convex surface, and an image-side surface is a concave surface;
the third lens has a refractive power;
the fourth lens has a refractive power;
the fifth lens has a positive refractive power;
the sixth lens has a negative refractive power, and an object-side surface thereof is a concave surface; and
SAG52 is an on-axis distance from an intersection point of an image-side surface of the fifth lens and the optical axis to a vertex of an effective semi-diameter of the image-side surface of the fifth lens, and SAG52 and a center thickness CT5 of the fifth lens on the optical axis satisfy 1<|SAG52/CT5|<1.5;
a spacing distance T56 of the fifth lens and the sixth lens on the optical axis and a spacing distance T23 of the second lens and the third lens on the optical axis satisfy 0.6<T56/T23<1.2.

12. The photographic optical system as claimed in claim 11, wherein an effective focal length f1 of the first lens and an effective focal length f6 of the sixth lens satisfy −2.5<f1/f6<−1.5.

13. The photographic optical system as claimed in claim 11, wherein an effective focal length f2 of the second lens and an effective focal length f5 of the fifth lens satisfy −2.5<f2/(f5*2)<−1.5.

14. The photographic optical system as claimed in claim 11, wherein a curvature radius R1 of the object-side surface of the first lens and a curvature radius R4 of the image-side surface of the second lens satisfy 1<R4/R1<2.

15. The photographic optical system as claimed in claim 11, wherein a curvature radius R3 of the object-side surface of the second lens and a curvature radius R11 of the object-side surface of the sixth lens satisfy −2.5<R3/R11<−1.

16. The photographic optical system as claimed in claim 11, wherein a center thickness CT1 of the first lens on the optical axis, a center thickness CT2 of the second lens on the optical axis and a center thickness CT3 of the third lens on the optical axis satisfy 1<CT1/(CT2+CT3)<1.5.

17. The photographic optical system as claimed in claim 11, wherein an edge thickness ET6 of the sixth lens and a center thickness CT6 of the sixth lens on the optical axis satisfy 1<ET6/CT6<2.

18. The photographic optical system as claimed in claim 16, wherein TTL is a distance from the object-side surface of the first lens to an imaging surface of the photographic optical system on the optical axis and ImgH is a half the diagonal length of an effective pixel area on the imaging surface of the photographic optical system, and TTL and ImgH satisfy TTL/ImgH<1.5.

\* \* \* \* \*